United States Patent [19]

Rotzinger et al.

[11] Patent Number: 5,955,522
[45] Date of Patent: Sep. 21, 1999

[54] PROCESS FOR THE PREPARATION OF STABILIZED OLEFIN POLYMERS

[75] Inventors: Bruno Rotzinger, Birsfelden; Thomas Schmutz, Riehen; Martin Brunner, Marly; Werner Stauffer, Fribourg, all of Switzerland

[73] Assignee: Ciba Specialty Chemicals Corporation, Tarrytown, N.Y.

[21] Appl. No.: 08/929,149

[22] Filed: Sep. 10, 1997

Related U.S. Application Data

[63] Continuation of application No. 08/668,889, Jun. 24, 1996, Pat. No. 5,703,149.

[30] Foreign Application Priority Data

Jun. 29, 1995 [CH] Switzerland ............... 1912/95

[51] Int. Cl.[6] ............... C08K 5/49; C08F 2/00
[52] U.S. Cl. ............... 524/119; 526/75; 526/193; 526/204
[58] Field of Search ............... 524/119; 526/75, 526/193, 204

[56] References Cited

U.S. PATENT DOCUMENTS

| | | | |
|---|---|---|---|
| 4,659,685 | 4/1987 | Coleman, III et al. | 502/113 |
| 5,240,894 | 8/1993 | Burkhardt et al. | 502/108 |
| 5,280,057 | 1/1994 | Nesvadba | 524/119 |
| 5,488,079 | 1/1996 | Staniek | 524/116 |
| 5,496,875 | 3/1996 | Borzatta et al. | 524/99 |

FOREIGN PATENT DOCUMENTS

| | | |
|---|---|---|
| 0003836 | 9/1979 | European Pat. Off. . |
| 0076576 | 4/1983 | European Pat. Off. . |
| 0192987 | 9/1986 | European Pat. Off. . |
| 0511665 | 11/1992 | European Pat. Off. . |
| 0544308 | 6/1993 | European Pat. Off. . |
| 0563917 | 10/1993 | European Pat. Off. . |
| 0578838 | 1/1994 | European Pat. Off. . |
| 0630910 | 12/1994 | European Pat. Off. . |
| 0644206 | 3/1995 | European Pat. Off. . |
| 9200333 | 1/1992 | WIPO . |
| 9604318 | 2/1996 | WIPO . |
| 9613531 | 5/1996 | WIPO . |

OTHER PUBLICATIONS

C.E. Wilen et al, Macromolecules 27(15), 1994, 4051–4057.
Derwent Abst. 93–313297/40.

*Primary Examiner*—Kriellion S. Morgan
*Attorney, Agent, or Firm*—David R. Crichton; Luther A. R. Hall

[57] ABSTRACT

A process is described for the preparation of olefin polymers by polymerization over a transition metallocene catalyst with the addition of at least one phosphorus(III) compound, sterically hindered amine, sterically hindered phenol or acid scavenger, alone or in combination with one another; the polymers which can be obtained in this way are of outstanding stability.

8 Claims, No Drawings

PROCESS FOR THE PREPARATION OF STABILIZED OLEFIN POLYMERS

This is a continuation of application Ser. No. 08/668,889 filed Jun. 24, 1996 which is now U.S. Pat. No. 5,703,149.

The present invention relates to a process for the preparation of stabilized olefin polymers, which entails the addition during the polymerization of a stabilizer with or without further additives. The invention also relates to the olefin polymers thus prepared.

The polymerization of olefins by means of organometallic complex catalysts (e.g. Ziegler-Natta catalysts) normally leads to a fine polymer powder which is granulated in an extruder prior to shaping. In the course of this granulation, substances such as stabilizers, corrosion-preventing compounds, colour improvers, antistatics or other processing auxiliaries are added to the polymer. During said granulation, the polymer is subject to thermal and fricative stresses, which may lead to damage. In addition, granulation is not always possible, as is the case, for example, with high molecular weight polymers. There is therefore a desire to add those additives which are important for processing and/or long-term stability at the actual polymerization stage. Such additives include those which reduce the corrosive action of the polymer with respect to metal surfaces, which is generally the result of catalyst residues or degradation products of the catalyst system.

It is known (EP-A-1 92 987 or U.S. Pat. No. 5,244,948) that in the case of a polymerization over supported catalysts it is possible to employ sterically hindered amine stabilizers of the polyalkylpiperidine type.

For polymerizations over supported catalysts, it has additionally been proposed (EP-A-0 254 348) to add organic phosphites or phosphonites during the polymerization, as antioxidants.

Recently, catalyst systems based on a transition metallocene complex have made it possible to prepare either polymers with a particularly narrow molecular weight distribution or (co)polymers with a particular structure. These systems can be either homogeneous catalyst systems or supported catalysts. More details on the possible catalyst systems can be found, for example, in EP-A-0 563 917, EP-A-0 578 838, U.S. Pat. No. 4,659,685, U.S. Pat. No. 5,240,894 and WO 92/00333. In order to attain the technically requisite stability with respect, in particular, to heat and light, these polymers too are usually granulated with the addition of various additives.

It has surprisingly now been found that the addition of phosphorus(lll) compounds, sterically hindered amines, sterically hindered phenols or acid scavengers, alone or in combination with one another, does not adversely affect the polymerization of olefins with the aid of metallocene complexes of transition metals. The resulting polymers are of excellent stability.

The invention therefore provides a process for the preparation of olefin polymers by polymerization over a transition metallocene complex, which comprises carrying out the polymerization with the addition of at least one phosphorus (III) compound, sterically hindered amine, sterically hindered phenol or acid scavenger, alone or in combination with one another, the addition, where used, of a phosphorus(III) compound and/or of a sterically hindered amine taking place only when at least 0.1% of the total conversion has already taken place.

The olefins which can be polymerized by this process are ethylene and a-olefins, for example propylene, 1-butene, 4-methyl-1-pentene, 5-methyl-1-hexene, isohexene, isooctene, cycloolefins (cyclopentadiene (monomeric or dimeric) or norbornene) or styrene, and mixtures of olefins, for example ethylene-propylene or propylene mixed with minor amounts of higher α-olefins. In this case preference is given to $C_2$- or $C_3$ olefins, their copolymers and styrene. The process is particularly advantageous for the polymerization and copolymerization of ethylene and propylene, especially for high molecular weight PE or PP. The term high molecular weight PE refers to a PE with a high molecular weight, i.e. an MW greater than 250,000 or a melt index less than 1 g/10 min at 5 kg and 190° C.

The transition metallocene catalysts are, for example, compounds of the formula $\{[R_1)(R_2M)_a]^{an+}an/q[LQ_m]^{q-}\}$ (A), in which a is 1 or 2 and n and q independently of one another are each an integer from 1 to 4, M is the cation of a monovalent to tetravalent metal from group IVb to VIIb, VII or Ib of the Periodic Table of the Elements, m is an integer corresponding to the valency of L+q, Q is a halogen atom, L is a divalent to heptavalent metal or nonmetal, $R_1$ is a π-arene and $R_2$ is a π-arene or the anion of a π-arene. Particularly suitable π-arenes $R_1$ and $R_2$ are aromatic groups having 6 to 24 carbon atoms or heteroaromatic groups having 3 to 30 carbon atoms, it being possible for these groups to be substituted one or more times by identical or different monovalent radicals, such as halogen atoms, preferably chlorine or bromine atoms, or $C_1$–$C_8$alkyl, $C_1$–$C_8$alkoxy, cyano, $C_1$–$C_8$alkylthio, $C_2$–$C_6$monocarboxylic acid alkyl ester, phenyl, $C_2$–$C_5$alkanoyl or benzoyl groups. These π-arene groups can be monocyclic, fused polycyclic or unfused polycyclic systems, where in the latter systems the rings can be linked directly or via bridging members such as —S— or —O—. $R_2$ as the anion of a π-arene can be an anion of a π-arene of the abovementioned type, for example the indenyl anion and, in particular, the cyclopentadienyl anion, it being possible for these anions too to be substituted one or more times by identical or different monovalent radicals such as $C_1$–$C_8$alkyl, $C_2$–$C_6$monocarboxylic acid alkyl ester, cyano, $C_2$–$C_5$alkanoyl or benzoyl groups.

The alkyl, alkoxy, alkylthio, monocarboxylic acid alkyl ester and alkanoyl substituents can be straight-chain or branched. Typical alkyl, alkoxy, alkylthio, monocarboxylic acid alkyl ester and alkanoyl substituents are methyl, ethyl, n-propyl, isopropyl, n-butyl, sec-butyl, tert-butyl, n-pentyl, n-hexyl and n-octyl, methoxy, ethoxy, n-propoxy, isopropoxy, n-butoxy, n-hexyloxy and n-octyloxy, methylthio, ethylthio, n-priopylthio, isopropylthio, n-butylthio, n-pentylthio and n-hexylthio, carboxylic acid methyl, ethyl, n-propyl, isopropyl, n-butyl and n-pentyl ester, and acetyl, propionyl, butyryl and valeroyl. Among these, preference is given to alkyl, alkoxy, alkylthio and monocarboxylic acid alkyl ester groups having 1 to 4 carbon atoms, in particular 1 or 2 carbon atoms, in the alkyl moieties, and to alkanoyl groups having 2 or 3 carbon atoms. Preferred substituted π-arenes or anions of substituted π-arenes are those containing one or two of the abovementioned substituents, especially chlorine or bromine atoms, methyl, ethyl, methoxy, ethoxy, cyano, carboxylic acid methyl or ethyl ester groups and acetyl groups.

The π-arenes $R_1$ and $R_2$ can be identical or different. Suitable heteroaromatic π-arenes are systems containing S, N and/or O atoms. Heteroaromatic π-arenes containing S and/or O atoms are preferred.

Examples of suitable π-arenes are benzene, toluene, xylenes, ethylbenzene, methoxybenzene, ethoxybenzene, dimethoxybenzene, p-chlorotoluene, chlorobenzene, bromobenzene, dichlorobenzene, acetylbenzene, trimethylbenzene, trimethoxybenzene, naphthalene, 1,2-dihydronaphthalene, 1,2,3,4-tetrahydronaphthalene, methylnaphthalenes, methoxynaphthalenes, ethoxynaphthalenes, chloronaphthalenes, bromonaphthalenes, biphenyl, indene, biphenylene, fluorene, phenanthrene, anthracene, 9,10-dihydroanthracene, triphenylene, pyrene, naphthacene, coronene, thiophene, chromene, xanthene, thioxanthene, benzothiophene, naphthothiophene, thianthrene, diphenylene oxide, diphenylene sulfide, acridine and carbazole.

If a is 2, $R_2$ is preferably in each case the anion of a π-arene and M is in each case the same metal atom.

Examples of anions of substituted π-arenes are the anions of methyl-, ethyl-, n-propyl- and n-butylcyclopentadiene, the anions of dimethylcyclopentadiene, of cyclopentadienecarboxylic acid methyl and ethyl ester, and also of acetylcyclopentadiene, propionylcyclopentadiene, cyanocyclopentadiene and benzoylcyclopentadiene. Preferred anions are the anion of unsubstituted indene and, in particular, that of unsubstituted cyclopentadiene.

Preferably, a is 1, $R_2$ is benzene, toluene, xylene, methoxybenzene, chlorobenzene, p-chlorotoluene, naphthalene, methyinaphthalene, chloronaphthalene, methoxynaphthalene, biphenyl, indene, pyrene or diphenylene sulfide and $R_2$ is the anion of cyclopentadiene, acetylcyclopentadiene or indene or is benzene, toluene, xylene, trimethylbenzene, naphthalene or methylnaphthalene.

Particularly preferred complexes of the formula (A) are those in which a is 1, $R_1$ is $\eta^6$-pyrene or $\eta^6$-naphthalene and $R_2$ is the anion of $\eta^5$-cyclopentadiene, n is preferably 1 or 2, in particular 1, and q is preferably 1. M is for example $Ti^{2+}$, $Ri^{3+}$, $Ti^{4+}$, $Zr^+$, $Zr^{2+}$, $Zr^{3+}$, $Zr^4$, $Hf^+$, $Hf^{2+}$, $Hf^{3+}$, $Hf^{4+}$, $Nb^+$, $Nb^{2+}$, $Nb^{3+}$, $Cr^+$, $Mo^+$, $Mo^{2+}$, $W^+$, $W^{2+}$, $Mn^+$, $Mn^{2+}$, $Re^+$, $Fe^{2+}$, $Co^{2+}$, $Co^{3+}$, $Ni^{2+}$ or $Cu^{2+}$. M is preferably a titanium, zirconium or hafnium cation, especially a titanium or zirconium cation, and with particular preference is $Ti^{4+}$ or $Zr^{4+}$.

Examples of suitable metals or nonmetals L are Sb, Fe, Sn, Bi, Al, Ga, In, Ti, Zr, Sc, V, Cr, Mn and Cu; lanthanides such as Ce, Pr and Nd or actinides such as Th, Pa, U or Np. Particularly suitable nonmetals are B, P and As. L is preferably P, As, B or Sb, with P being particularly preferred.

Complex anions $[Lq_m]^{q-}$ are, for example, $BF_4^-$, $PF_6^-$, $AsF_6^-$, $SbF_6^-$, $FeCl_4^-$, $SnCl_6^-$, $SbCl_6^-$ and $BiCl_6^-$. The particularly preferred complex anions are $SbF_6^-$, $BF_4^-$, $AsF_6^-$ and $PF_6^-$.

The compounds of the formula (A) can be prepared by methods known per se, for example by reacting a compound of the formula $\{[(R_1(R_2M)_a]^{an+}an/q[X]^{q-}\}$ (B) with a salt of an anion $[LQ_m]^{q-}$, in which a, m, n, q, $R_1$, $R_2$, M and L are as defined under the formula (A) and $[X]^{q-}$, is an anion which is different from $[LQ_m]^{q-}$.

Both the compounds of the formula (B) and the compounds of the formula $\{[(R'_1)(R_2M_a)]\}$ (C), in which a and M are as defined above and $R'_1$ is a π-arene or the anion of a π-arene and $R_2$ is an anion of a π-arene, can be prepared by reacting identical or different π-arenes in the presence of a Lewis acid with a salt of a metal from group IVb to VIIb, VII or Ib of the Periodic Table. The compounds of the formulae (A), (B) and (C) are also suitable for carrying out a ligand exchange, by reacting these compounds in the presence of a Lewis acid with a π-arene which is different from $R_1$ and/or $R_2$, or $R'_1$. In such cases, n is preferably 2 and particularly preferably 1.

Compounds of the formula (A) in which L is a metal can be prepared by reacting identical or different π-arenes in the presence of a Lewis acid with a suitable salt of a metal from group IVb to VIIb, VII or Ib of the Periodic Table of the Elements, for example a titanium, zirconium, chromium, manganese or, in particular, iron salt. Finally, compounds of the formula (A) can also be converted in a customary manner, by anion exchange, into complexes of the formula (A) with a different anion $[LQ_m]^{q-}$.

In a preferred embodiment the starting materials employed are uncharged ic-complexes of the formula (C), for example ferrocene or bis($\eta^5$-indenyl)iron(II), and these starting materials are converted by ligand exchange into a complex of the formula (B), which is subsequently reacted with a salt of an anion $[LQ_m]^{q-}$. The complex of the formula (B) obtained as intermediate in this procedure is normally not isolated.

Examples of suitable salts of anions $[LQ_m]^{q-}$ are alkali metal, alkaline earth metal or ammonium salts. It is preferred to use alkali metal salts, and particularly preferably sodium salts and potassium salts.

Examples of suitable Lewis acids for the reactions described above are $AlCl_3$, $AlBr_3$, $BF_3$, $SnCl_4$ and $TiCl_4$, preferably $AlCl_3$. It can be advantageous to carry out the ligand exchange reaction with the addition of a reducing agent, for example aluminium or magnesium, to the reaction mixture, or to add a reducing agent, for example $Na_2SO_3$ or ascorbic acid, to the reaction mixture subsequently. Aluminium is the preferred reducing agent. The ligand exchange reactions are expediently carried out in an inert organic solvent. Examples of suitable solvents are aliphatic or cycloaliphatic hydrocarbons such as octane, nonane, decane and cyclohexane. If desired, an excess of π-arene can also be employed as solvent.

The reaction of the compounds of the formula (B) with a salt of an anion $[LQ_m]^{q-}$ and the anion exchange conversion of compounds of the formula (A) are expediently carried out in an aqueous or aqueous alcoholic medium, for example in mixtures of water and methanol or ethanol. The salts of the anions $[LQ_m]^{q-}$ are employed at least in stoichiometric amounts but preferably in excess.

In the process according to the invention it is additionally possible to use a metallocene catalyst consisting of two principal components (A-1 and A-2). Of these, component A-1 is a metallocene compound. It is possible in principle to employ any metallocene regardless of its structure and composition. The metallocenes can be either bridged or unbridged, and can have identical or different ligands. The compounds involved are those of the metals of groups IVb, Vb or VIb of the Periodic Table, for example compounds of titanium, zirconium, hafnium, vanadium, niobium, tantalum, chromium, molybdenum and tungsten, preferably of zirconium, hafnium and titanium, especially zirconium.

Such metallocenes are known and are described, for example, in the following documents: EP-A-0 336 127, EP-A-0 336 128, EP-A-0 387 690, EP-A-0 387 691, EP-A0 302 424, EP-A-0 129 368, EP-A-0 320 762, EP-A-0 284 707, EP-A-0 316 155, EP-A-0 351 392, U.S. Pat. No. 5,017,714, J. Organomet, Chem., 342 (1988) 21.

Metallocenes worthy of emphasis are those of the general structure

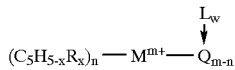

in which $M^{m+}$ is an m-valent cation of a metal of groups IVb, V or VIb of the Periodic Table, for example titanium, zirconium, hafnium, vanadium, niobium, tantalum, chromium, molybdenum or tungsten, preferably zirconium, hafnium or titanium, especially zirconium; $(C_5H_{5-x}R_x)$ is a cyclopentadienyl ring substituted with from zero to five substituents R;

x is zero, one, two, three, four or five;

n is one or two;

each R, independently of the others, is a $C_1$–$C_{20}$ hydrocarbon radical, a $C_1$–$C_{20}$ hydrocarbon radical substituted by one or more halogen atoms, a metalloid-substituted $C_1$–$C_{20}$ hydrocarbon radical or halogen; or two adjacent radicals R are a $C_4$–$C_{20}$ ring; or, if n is 1, alternatively a radical $B_{y-}JR'_{z+y}$, in which J is an element of group Va of the Periodic Table of coordination number 3 or an element of group VIa of the Periodic Table of coordination number 2, preferably N, P, O or S;

each R', independently of the others, is a $C_1$–$C_{20}$ hydrocarbon radical or a $C_1$–$C_{20}$ hydrocarbon radical which is substituted by one or more halogen atoms;

z is the coordination number of the element J;

y is zero or one;

B, if y is one, is a bridging member comprising an element of group IVA or VA of the Periodic Table, for example $C_1$–$C_{20}$alkylene, a $DiC_1$–$C_{20}$alkyl-, $C_7$–$C_{20}$alkylaryl- or $DiC_6$–$C_{20}$arylsilicon or germanium radical or an alkyl- or aryl-phosphine or amine radical; or R, if n is two, is a group selected from —$M_2(R_{10})(R_{11})$—, —$M_2(R_{10})(R_{11})$—$M_2(R_{10})(R_{11})$—$C(R_{10})(R_{11})$—$C(R_{10})(R_{11})$—, —O—$M_2(R_{10})(R_{11})$—O—, —$C(R_{10})(R_{11})$—, —O—$M_2(R_{10})(R_{11})$—, —$C(R_{10})(R_{11})M_2(R_{10})(R_{11})$, —$B(R_{10})$—, —$Al(R_{10})$—, —Ge—, —Sn—, —O—, —S—, —S(O)—, —$S(O)_2$—, —$N(R_{10})$—, —C(O)—, —$P(R_{10})$— or —$P(O)(R_{10})$—;

in which $R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$, in each case with the atoms which join them, form a ring, and $M_2$ is silicon, germanium or tin, each Q, independently of the others, is hydrogen, a $C_1$–$C_{50}$ hydrocarbon radical, a $C_1$–$C_{50}$ hydrocarbon radical which is substituted with one or more electron-withdrawing groups, for example halogen or alkoxy, or a metalloid-substituted $C_1$–$C_{50}$ hydrocarbon radical, the metalloid being an element of group IVA of the Periodic Table, with the exception of hydrocarbon radicals of the formula $(C_5H_{5-x}R_x)$; or two radicals Q are alkylidene, olefin, acetylene or a cyclometallated hydrocarbon radical;

L is a neutral Lewis base, for example diethyl ether, tetrahydrofuran, dimethylaniline, aniline, trimethylphosphine or n-butylamine; and w is from 0 to 3.

The term metalloid refers, for example, to the elements silicon, germanium, tin and lead.

In this context, a preferred type of metallocene corresponds to the following structure:

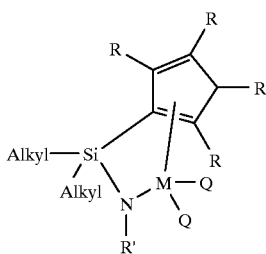

in which M is Ti or Zr and the other substituents are as defined above.

Further details on metallocenes of the above type can also be found in WO 92/00333.

For the isospecific polymerization of substituted olefins, for example propene, butene and styrene, and their copolymerization, including that with other olefins, the metallocenes which are of interest, especially zirconocenes, are those which carry indenyl derivatives as ligands. These are preferably the compounds of the following formula I

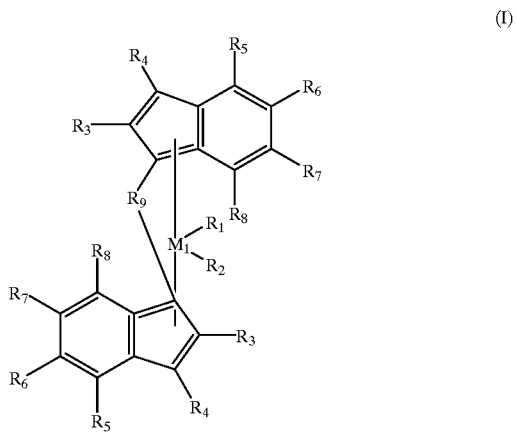

(I)

in which $M_1$ is a metal of group IVb, Vb or VIb of the Periodic Table;

$R_1$ and $R_2$ are identical or different and are a hydrogen atom, a $C_1$–$C_{10}$alkyl, $C_1$–$C_{10}$alkoxy, $C_6$–$C_{10}$aryl, $C_1$–$C_{10}$aryloxy, $C_2$–$C_{10}$alkenyl, $C_7$–$C_{40}$arylalkyl, $C_7$–$C_{40}$alkylaryl, $C_8$–$C_{40}$arylalkenyl or OH group or a halogen atom, and the radicals $R_3$ are identical or different and are a hydrogen atom, a halogen atom, a $C_1$–$C_{10}$alkyl group which can be halogenated, a $C_6$–$C_{10}$aryl group, or a radical —$NR_2$, —SR, —$OSiR_3$, —$SiR_3$ or $PR_2$, in which R is a halogen atom, a $C_1$–$C_{10}$alkyl group or a $C_6$–$C_{10}$aryl group.

$R_4$ to R8 are as defined for $R_3$, or adjacent radicals $R_4$ to $R_8$ form, with the atoms connecting them, an aromatic or aliphatic ring, $R_9$ is a group selected from —$M_2(R_{10})(R_{11})$—, —$M_2(R_{10})(R_{11})$—$M_2(R_{10})(R_{11})$—, —$C(R_{10})(R_{11})C(R_{10})(R_{11})$—, —O—$M_2(R_{10})(R_{11})$—O—, —$C(R_{10})(R_{11})$—, —O—$M_2(R_{10})(R_{11})$—, —$C(R_{10})(R_{11})$—$M_2(R_{10})(R_{11})$—, —$B(R_{10})$—, —$Al(R_{10})$—, —Ge—, —Sn—. —O—, —S—, —S(O)—, —$S(O)_2$—, —$N(R_{10})$—, —C(O)—, —$P(R_{10})$— or —$P(O)(R_{10})$—; in which $R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$ in each case with the atoms connecting them, form a ring, and $M_2$ is silicon, germanium or tin.

The 4,5,6,7-tetrahydroindenyl analogues corresponding to the compounds of the formula (I) are also of importance.

Preferably, in formula (I), $M_1$ is zirconium, $R_1$ and $R_2$ are identical and are methyl or chlorine, especially chlorine, $R_3$ to $R_8$ are hydrogen or $C_1$–$C_4$alkyl, $R_9$ is —$Si(R_{10})(R_{11})$—, —$C(R_{10})(R_{11})$— or —$C(R_{10})(R_{11})$—$C(R_{10})(R_{11})$— and $R_{10}$ and $R_{11}$ are identical or different and are $C_1$–$C_4$alkyl or $C_6$–$C_{10}$aryl. In particular, $R_{10}$ and $R_{11}$, are identical or different and are methyl or phenyl.

The indenyl and/or tetrahydroindenyl ligands in formula (I) are preferably substituted in the 2, 2,4, 4,7, 2,6, 2,4,6, 2,5,6, 2,4,5,6 or 2,4,5,6,7 positions, in particular in the 2,4,6 positions. The substituents are preferably a $C_1$–$C_4$alkyl group such as methyl, ethyl or isopropyl. The 2 position is preferably substituted by methyl.

Also of particular importance are those compounds of the formula (I) in which the substituents in positions 4 and 5 of the indenyl radicals ($R_5$ and $R_6$) form, together with the atoms connecting them, a benzene ring. This fused ring system can likewise be substituted by radicals having the definitions of $R_3$–$R_8$. An example of such compounds I is dimethylsilanediylbis(2-methyl4,5-benzoindenyl)zirconium dichloride.

The metallocenes of the formula (I) are particularly suitable for the preparation of high molecular weight polyolefins of high stereoregularity.

Also of particular importance are compounds of the formula (I) with (substituted) phenyl or naphthyl substituted in position 4.

For the syndiospecific polymerization of substituted olefins, for example propene, butene and styrene, and their copolymerization, including that with other olefins, the metallocenes of interest are those of the formula (II):

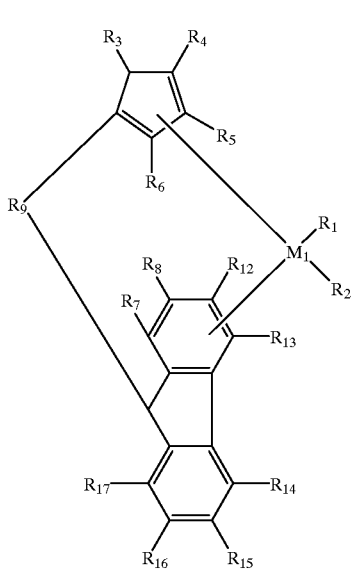

(II)

in which $M_1$ is a metal of group IVb, Vb or VIb of the Periodic Table;

$R_1$ and $R_2$ are identical or different and are a hydrogen atom, a $C_1$–$C_{10}$alkyl, $C_1$–$C_{10}$alkoxy, $C_6$–$C_{10}$aryl, $C_6$–$C_{10}$aryloxy, $C_2$–$C_{10}$alkenyl, $C_7C_{40}$arylalkyl, $C_7$–$C_{40}$alkylaryl, $C_8$–$C_{40}$arylalkenyl or OH group or a halogen atom, and the radicals $R_3$ are identical or different and are a hydrogen atom, a halogen atom, a $C_1$–$C_{10}$alkyl group which can be halogenated, a $C_6$–$C_{10}$aryl group, or a radical —$NR_2$, —SR, —$OSiR_3$, —$SiR_3$ or $PR_2$, in which R is a halogen atom, a $C_1$–$C_{10}$alkyl group or a $C_6$–$C_{10}$aryl group.

$R_4$ to $R_8$ are as defined for $R_3$, or adjacent radicals $R_4$ to $R_8$ form, with the atoms connecting them, an aromatic or aliphatic ring, $R_9$ is a group selected from —$M_2(R_{10})(R_{11})$—, —$M_2(R_{10})(R_{11})$—$M_2(R_{10})(R_{11})$—, —$C(R_{10})(R_{11})C(R_{10})(R_{11})$—, —O—$M_2(R_{10})(R_{11})$—O—, —$C(R_{10})(R_{11})$—, —O—$M_2(R_{10})(R_{11})$—, —$C(R_{10})(R_{11})$—$M_2(R_{10})(R_{11})$—, —B($R_{10}$)—, —Al($R_{10}$)—, —Ge—, —Sn—, —O—, —S—, —S(O)—, —S(O)$_2$—, —N($R_{10}$)—, —C(O)—, —P($R_{10}$)— or —P(O)($R_{10}$)—; in which $R_{10}$ and $R_{11}$, are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$ in each case with the atoms connecting them, form a ring, and $M_2$ is silicon, germanium or tin; and $R_{12}$ to $R_{17}$ are as defined for $R_3$.

Examples of metallocenes which can be used in accordance with the invention are the following compounds: biscyclopentadienylzirconium dichloride, biscyclopentadienylzirconiumdimethyl, biscyclopentadienylzirconiumdiphenyl, biscyclopentadienylzirconiumdibenzyl, biscyclopentadienylzirconiumbistrimethylsilyl, bis (methylcyclopentadienyl)zirconium dichloride, bis(1,2-dimethylcyclopentadienyl)zirconium dichloride, bis(1,3-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(pentamethylcyclopentadienyl)zirconium dichloride, bisindenylzirconium dichloride, bis(tetrahydroindenyl)zirconium dichloride, dimethylsilylbis-1-tetrahydroindenylzirconium dichloride, dimethylsilylbis-1-(2-methyltetrahydroindenyl)zirconium dichloride, dimethylsilylbis-1-(2,3,5-trimethylcyclopentadienyl) zirconium dichloride, dimethylsilylbis-1-(2,4-dimethylcyclopentadienyl)zirconium dichloride, dimethylsilylbis-1-indenylzirconium dichloride, dimethylsilylbis-1-indenylzirconiumdimethyl, dimethylgermylbis-1-indenylzirconium dichloride, dimethylsilylbis-1-(2-methylindenyl)zirconium dichloride, dimethylsilylbis-1-(2-methyl-4-isopropylindenyl)zirconium dichloride, phenylmethylsilylbis-1-(2-methylindenyl) zirconium dichloride, dimethylsilylbis-1-(2-methyl-4-ethylindenyl)zirconium dichloride, ethylenebis-1-(4,7-dimethylindenyl)zirconium dichloride, phenyl(methyl) silylbis-1-indenylzirconium dichloride, phenyl(vinyl) silylbis-1-indenylzirconium dichloride, diphenylsilylbis-1-indenylzirconium dichloride, dimethylsilylbis(1-(2-methyl-4-tert-butylindenyl))zirconium dichloride, methylphenylsilylbis(1-(2-methyl-4-isopropylindenyl)) zirconium dichloride, dimethylsilylbis(1-(2-ethyl-4-methylindenyl))zirconium dichloride, dimethylsilylbis(1-(2, 4-dimethylindenyl))zirconium dichloride, dimethylsilylbis (1-(2-methyl-4-ethylindenyl))-zirconium dichloride, dimethylsilylbis(2-methyl-4,6-diisopropylindenyl)-zirconium dichloride, dimethylsilylbis(2,4,6-trimethylindenyl)zirconium dichloride, methylphenylsilylbis(2-methyl-4,6-diisopropylindenyl) zirconium dichloride, 1,2-ethanediylbis(2-methyl4,6-diisopropylindenyl)zirconium dichloride, dimethylsilyl(9-fluorenyl)(cyclopentadienyl)-zirconium dichloride, diphenylsilyl(9-fluorenyl)(cyclopentadienyl)zirconium dichloride, diphenylmethylene(9-fluorenyl) cyclopentadienylzirconium dichloride, isopropylidene(9-fluorenyl)cyclopentadienylzirconium dichloride, phenylmethylmethylene(9-fluorenyl) cyclopentadienylzirconium dichloride, isopropylidene(9-fluorenyl)(1-(3-isopropyl)cyclopentadienyl)zirconium dichloride, isopropylidene(9-fluorenyl)(1-(3-methyl) cyclopentadienyl)zirconium dichloride, diphenylmethylene (9-fluorenyl)(1-(3-methyl)cyclopentadienyl)zirconium dichloride, methylphenylmethylene(9-fluorenyl)(1-(3- methyl)cyclopentadienyl)zirconium dichloride, dimethylsilyl(9-fluorenyl)-(1-(3-methyl)cyclopentadienyl) zirconium dichloride, diphenylsilyl(9-fluorenyl)-(1-(3-methyl)cyclopentadienyl)zirconium dichloride, diphenylmethylene(9-fluorenyl)(1-(3-tert-butyl) cyclopentadienyl)zirconium dichloride and isopropylidene (9-fluorenyl)(1-(3-tert-butyl)cyclopentadienyl)zirconium dichloride.

In the preparation of the catalyst, chiral metallocenes are preferably employed as a racemate. However, it is also possible to use the pure R or S form. Using these pure stereoisomeric forms, optically active polymer can be prepared. However, the meso form of the metallocenes should be separated off, since the polymerization-active centre (the metal atom) in these compounds is no longer chiral, owing to mirror symmetry at the central metal, and is therefore unable to produce highly tactic polymer. If the meso form is not separated off, atactic polymer is produced in addition to isotactic or syndiotactic polymers. For certain applications, for example flexible mouldings, or for the preparation of polyethylene grades, this may be entirely desirable. The stereoisomers are separated by methods known from the literature.

As component A-2, examples of suitable compounds are the following.

a) Aluminoxanes

The aluminoxane used is preferably a compound of the formula (III)

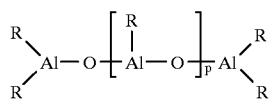

(III)

for the linear type and/or of the formula (IV)

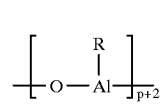

(IV)

for the cyclic type, in which formulae (III) and (IV) the radicals R can be identical or different and are a $C_1$–$C_6$alkyl group, a $C_6$–$C_{18}$aryl group, benzyl or hydrogen, and p is an integer from 2 to 50, preferably from 10 to 35.

The radicals R are preferably identical and are methyl, isobutyl, n-butyl, phenyl or benzyl, particularly preferably methyl.

Where the radicals R are different, they are preferably methyl and hydrogen, methyl and isobutyl or methyl and n-butyl, with the content of hydrogen or isobutyl or n-butyl preferably being 0.01–40% (number of radicals R).

The aluminoxane can be prepared by known methods in various ways. One of the methods, for example, is the reaction of an aluminium hydrocarbon compound and/or a hydridoaluminium-hydrocarbon compound with water (in gaseous, solid or liquid form or else in bound form, for example as water of crystallization) in an inert solvent (for example toluene). To prepare an aluminoxane with different alkyl groups R, two different aluminium trialkyls ($AlR_3$+ $AlR'_3$), in accordance with the desired composition and reactivity, are reacted with water (cf. S. Pasynkiewicz, Polyhedron 9 (1990) 429 and EP-A-302424).

The precise structure of the aluminoxanes of the formulae (III) and (IV) is unknown.

Regardless of the manner of their preparation, all aluminoxane solutions share the feature of a varying content of unreacted aluminium starting compound, which is present in free form or as an adduct.

b) Ion exchange compounds

Ion exchange compounds are compounds comprising a cation, which reacts irreversibly with a ligand of component A-1, and a noncoordinating anion, which is bulky, labile and chemically inert. Combining components A-1 and A-2 produces an ion pair formed from the cation of A-2 and a ligand of A-1. Examples of cations of component A-2 are Brønsted acids, such as ammonium ions, or reducible Lewis acids, such as $Ag^+$ or ferrocene ions.

The aluminoxane which can be used as component A-2 can also be produced in the course of the preparation of a supported catalyst from trimethylaluminium.

In addition to homogeneous catalyst systems, the metallocenes can also be used as heterogeneous catalysts. In this case the catalyst is applied to an inorganic or organic carrier by methods known to the person skilled in the art from the literature. Inorganic carrier materials are preferably silica gels; further details on this can be found, for example, in U.S. Pat. No. 5,240,894.

Examples of organic carrier materials are microporous polymeric carriers which are obtainable commercially (e.g. the ®Accurel grades from AKZO, such as ®Accurel-PE, ®Accurel-PP, ®Accurel-PA-6 or ®Accurel-PA-12 with a voids content of about 75% by volume). The pore size of the ®Accurel materials is 0.5–5 µm (PP), 1.0–5 µm (HDPE), or 0.5–3 µm (PA-6 and PA-12).

The microporous polymeric carrier is advantageously dried beforehand, for example by treatment with aluminium alkyl solutions, then washed and rendered inert under a protective gas.

The preferred procedure for this is first to react the aluminoxane in an appropriate solvent, for example pentane, hexane, heptane, toluene or dichloromethane, with at least one metallocene, by intensive mixing, for example by stirring. The reaction temperature is preferably from −20 to +120° C., in particular 15–40° C. The molar ratio of aluminium to transition metal M of the metallocene is preferably between 10:1 and 10,000:1, in particular between 100:1 and 2000:1. The reaction time is in general between 5 and 120 minutes, preferably 10–30 minutes. The reaction is preferably operated with an aluminium concentration of more than 0.01 mol/liter, in particular more than 0.5 mol/liter. The reaction is carried out under inert conditions.

In place of the aluminoxane it is also possible to use a mixture of an aluminoxane with a further aluminium alkyl compound, for example trimethyl-, triethyl- or triisobutylaluminium, for the described reaction with the metallocene.

After the reaction has taken place it is possible, for example, to remove part of the solvent under vacuum or, following concentration, to replace the solvent by a different solvent. The solution thus prepared is reacted in a suitable manner with the microporous polymeric carrier. In this context, the carrier is added at least in an amount whose total pore volume is able to take up the solution from the previous reaction. The reaction referred to in the second sentence of this paragraph is preferably carried out at temperatures of between −20 and +20° C., in particular 15–40° C., by intense mixing, for example by stirring or treatment with ultrasound. Thorough homogenization should be accomplished. In this context, the exchange of the inert gas of the pore volume can be accelerated by brief evacuation, for example.

In principle, the supported catalyst can also be prepared in a one-pot reaction, i.e. all three starting components are reacted with one another simultaneously in an appropriate solvent/suspension medium. In this context, the amount of the polymeric carrier should preferably be calculated such that it is able to take up the entire volume of liquid.

The catalyst can be metered into the polymerization system in suspended form, in an inert suspension medium such as, for example, heptane, n-decane, hexane or diesel oil, or else in dry form, possibly after removal of the remaining solvent by a drying step carried out, for example, under vacuum.

The catalyst can advantageously be prepolymerized in the gaseous phase, in the liquid monomer or in suspension in which case it is possible to omit the addition of a further organoaluminium compound.

Polymerization with these catalysts can be carried out by known methods in liquid or gaseous phase. The liquid phase may, for example, be an aliphatic hydrocarbon or the liquid monomer itself. The metallocene catalysts can also be employed as a mixture with other types of catalyst, for example Ziegler or Phillips catalysts. At the end of the polymerization the catalyst is destroyed, for example by adding water (vapour), wet nitrogen, carbon dioxide or alcohol.

In accordance with the invention the phosphorus(III) compound, the sterically hindered amine, the sterically hindered phenol or the acid scavenger, alone or in combination with one another, is or are added to the polymerization medium at the beginning of, during or towards the end of the polymerization, prior to its termination. In the case of batch polymerizations, the compounds mentioned with or without the further additives are preferably added at the beginning. In the case of the continuous polymerizations which are frequently carried out on the industrial scale, the compounds mentioned with or without the further additives are added likewise continuously, either separately or together with the monomers.

The phosphorus(III) compounds to be used in accordance with the invention are known per se as polymer stabilizers; they are often referred to as phosphites and phosphonites.

Phosphites, for example, are of the formulae V–IX

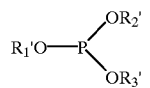
(V)

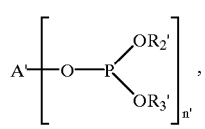
(VI)

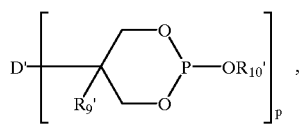
(VII)

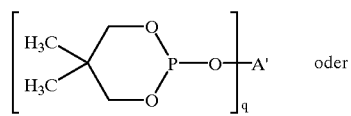
(VIII)

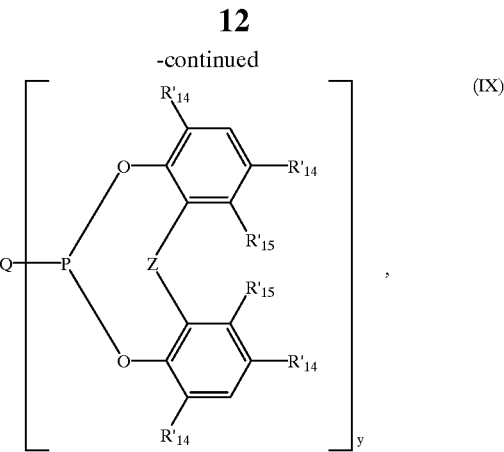
(IX)

in which
R'$_1$, R'$_2$ and R'$_3$ independently of one another are alkyl having 1 to 18 carbon atoms, halogen-, —COOR'$_4$—, —CN— or —CONR'$_4$R'$_4$-substituted alkyl having 1 to 18 carbon atoms, alkyl having 2 to 18 carbon atoms which is interrupted by —S—, —O— or —NR'$_4$—, cycloalkyl having 5 to 8 carbon atoms, phenyl or naphthyl, phenyl or naphthyl which are substituted by halogen or by 1 to 3 alkyl or alkoxy radicals having a total of 1 to 18 carbon atoms, 2,2,6,6-tetramethylpiperid-4-yl, N-allyl- or N-benzyl- or N-alkyl-2,2,6,6-tetramethylpiperid-4-yl having 1 to 4 carbon atoms in the alkyl moiety or N-alkanoyl-2,2,6,6-tetramethylpiperid-4-yl having 1 to 4 carbon atoms in the alkyl moiety, or N-alkylene-2,2,6,6-tetramethylpiperidyl or N-alkylene-4-alkoxy-2,2,6,6-tetramethylpiperidyl having 1 to 3 carbon atoms in the alkylene moiety and 1 to 18 carbon atoms in the alkoxy moiety, R'$_4$, or the radicals R'$_4$ independently of one another, is or are hydrogen, alkyl having 1 to 18 carbon atoms, cycloalkyl having 5 to 12 carbon atoms or phenylalkyl having 1 to 4 carbon atoms in the alkyl moiety, n' is 2,3 or 4, A', if n' or q is 2, is alkylene having 2 to 12 carbon atoms, alkylene having 2 to 12 carbon atoms which is interrupted by —S—, —O— or —NR'$_4$—, in which R'$_4$ is as defined above, or a radical of the formula

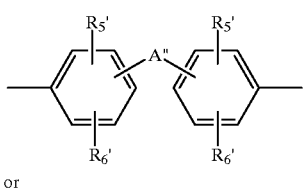

or

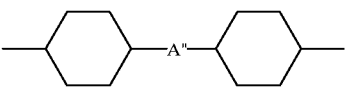

A', if n' or q is 3, is a radical of the formula $C_rH_{2r-1}$— or $N(CH_2CH_2—)_3$, r is 5 or 6, A', if n' is 4, is the radical of the formula $C(CH_2—)_4$, R'$_5$ and R'$_6$, independently of one another are hydrogen or alkyl having 1 to 8 carbon atoms, A" is a radical of the formula —CH$_2$—, —CHR'$_4$—, —CR'$_1$R'$_4$—, —S— or a direct bond, where R'$_1$ and R'$_4$ are as defined, p is 1 or 2, D', if p is 1, is methyl and, if p is 2, is —CH$_2$OCH$_2$—,
R'$_9$ is methyl and R'$_{10}$ is as defined for R'$_1$,
q is 2 or 3,
y is 1, 2 or 3,
Q, if y is 1, is alkyl having 1 to 18 carbon atoms, a radical of the formula —OR'$_{16}$, NR'$_{17}$R'$_{18}$ or fluorine,
Q, if y is 2, is a radical of the formula —O—A'"—O— or

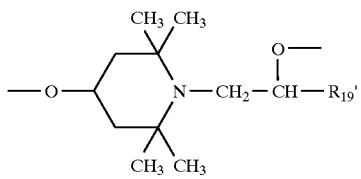

Q, if y is 3, is a radical of the formula R'$_4$C(CH$_2$O—)$_3$, N(C$_2$H$_4$O—)$_3$ or N(C$_3$H$_6$O—)$_3$, where
R'$_4$ is as defined,
R'$_{16}$ is as defined for R'$_1$,
R'$_{17}$ and R'$_{18}$ independently of one another are alkyl having 1 to 18 carbon atoms, benzyl, cyclohexyl or a 2,2,6,6-tetra- or 1,2,2,6,6-pentamethylpiperid-4-yl radical, or R'$_{17}$ and R'$_{18}$ together form butylene, pentylene, hexylene or the radical of the formula

—CH$_2$CH$_2$—O—CH$_2$CH$_2$—,

A'" is as defined for A', if n' is 2,
R'$_{19}$ is hydrogen or methyl,
the substituents R'$_{14}$ independently of one another are hydrogen, alkyl having 1 to 9 carbon atoms or cyclohexyl,
R'$_{15}$ is hydrogen or methyl, and
Z is a direct bond, —CH$_2$—, —C(R'$_{14}$)$_2$ or —S—, where the substituents R'$_{14}$ are identical or different and are as defined.

Particularly suitable phosphites of the formula (V) are those in which R'$_1$, R'$_2$ and R'$_3$ independently of one another are alkyl having 1 to 18 carbon atoms, phenyl, phenyl which is substituted with 1 to 3 alkyl radicals having a total of 1 to 18 carbon atoms, or 2,2,6,6-tetramethylpiperid-4-yl, and in particular, independently of one another, are phenyl which is substituted with 1 to 3 alkyl radicals having a total of 1 to 12 carbon atoms.

Particularly suitable phosphites of the formula (VI) are those in which A' is preferably, if n' is 2, alkylene having 2 to 12 carbon atoms, —CH$_2$CH$_2$—O—CH$_2$CH$_2$—, —CH$_2$CH$_2$O—CH$_2$CH$_2$O—CH$_2$CH$_2$— or —CH$_2$CH$_2$—NR'$_4$—CH$_2$CH$_2$—, or A', if n' is 3, is N(CH$_2$CH$_2$—)$_3$ where R'$_4$ is alkyl having 1 to 4 carbon atoms.

Particularly suitable phosphites of the formula (VII) are those in which p is 1, D' is methyl, R'$_9$ is methyl and R'$_{10}$ is phenyl substituted with 1 to 3 alkyl radicals having a total of 1 to 18 carbon atoms.

Particularly suitable phosphites of the formula (IX) are those in which Q, if y is 1, is a radical of the formula —OR'$_{16}$, —NR'$_{17}$R'$_{18}$ or fluorine, or Q, if y is 2, is a radical of the formula —O—CH$_2$CH$_2$—NR'$_4$—CH$_2$CH$_2$-O-, or W, if y is 3, is a radical of the formula N(CH$_2$CH$_2$O—)$_3$, where R'$_{16}$ is alkyl having 1 to 18 carbon atoms, R'$_{17}$ and R'$_{18}$ independently of one another are alkyl having 1 to 18 carbon atoms, cyclohexyl or benzyl, or R'$_{17}$ and R'$_{18}$ together form a piperidyl, morpholinyl or hexamethyleneimino radical, and R'$_4$ is as defined, Z is a direct bond, —CH$_2$— or —CH(CH$_3$)—, and the two substituents R'$_{14}$ independently of one another are alkyl having 1 to 4 carbon atoms, and in particular, if y is 1, Q is 2-ethylhexyloxy or fluorine, R'$_{14}$ is tert-butyl, R'$_{15}$ is hydrogen and Z is —CH$_2$— or —CH (CH$_3$)—, or Q, if y is 2, is a radical of the formula —O—CH$_2$CH$_2$—NCH$_3$—CH$_2$CH$_2$—O—.

Examples of preferred phosphites are trilauryl phosphite, trioctadecyl phosphite, distearylpentaerythritol diphosphite or tristearylsorbitol triphosphite.

Furthermore, aromatic phosphites are preferred. Aromatic phosphites are those having an aromatic hydrocarbon radical, for example a phenyl radical. Examples thereof are triphenyl phosphite, diphenylalkyl phosphites, phenyidialkyl phosphites and, specifically, tris(nonylphenyl) phosphite, tris(2,4-Di-tert-butylphenyl) phosphite, bis(2,4-Di-tert-butylphenyl)pentaerythritol diphosphite and 2,2'-ethylidenebis(4,6-Di-tert-butylphenyl) fluorophosphite.

Of particular interest are phosphites comprising as structural element the group P—O—Ar, in which Ar is an aromatic radical, preferably an alkyl-substituted phenyl radical. Suitable alkyl substituents are C$_1$–C$_{18}$alkyl radicals or C$_5$–C$_7$cycloalkyl radicals; preference is given to C$_1$–C$_4$alkyl radicals and, in particular, to tert-butyl (reproduced in the formulae as

 ).

Particular preference is given to the use of the following phosphites: tris(2,4-Di-tert-butylphenyl) phosphite;

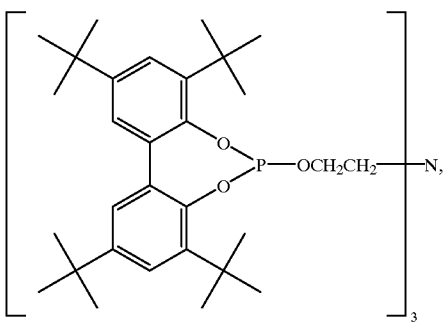

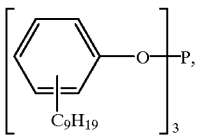

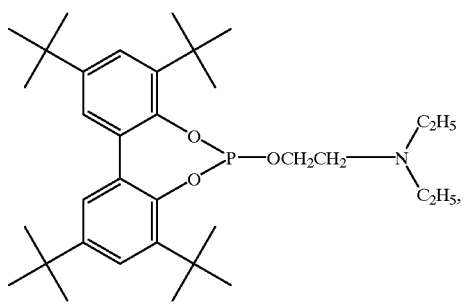

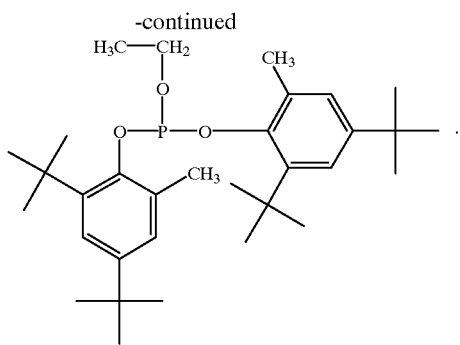

Very particular preference is given to the use of tris(2,4-Di-tert-butylphenyl) phosphite or

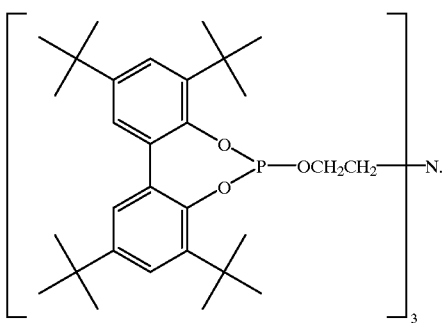

Phosphonites in the context of this invention can be represented, for example, by the formula X

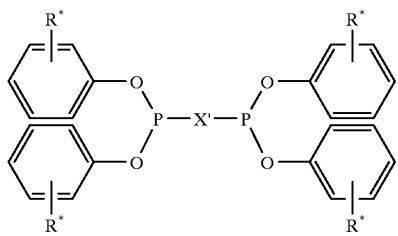
(X)

in which R* is from one to five $C_1$-$C_8$alkyl radicals;

X' is a radical

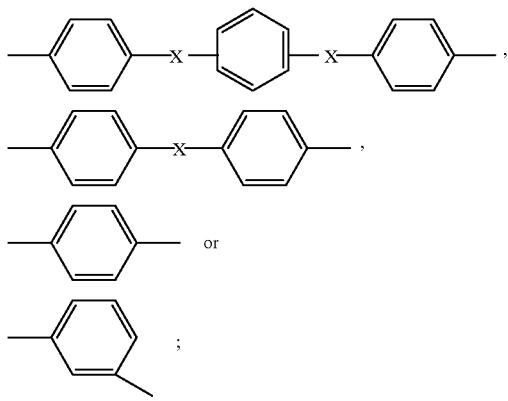

and X is a direct bond, —(O)S(O)—, —C(O)—, —S—, —O— or arylene.

Arylene is for example naphthylene, m-phenylene or p-phenylene.

In particular, R* is from one to three tert-butyl or methyl groups. X' is in particular a 4,4'-biphenyidiyl radical.

Tetrakis(2,4-Di-tert-butylphenyl)-4,4'-biphenylene diphosphonite (Irgafos PEPQ) is very particularly preferred.

In the context of the present invention, it is also possible in place of a single phosphorus(III) compound to use a mixture of different phosphorus(III) compounds.

The amount of phosphorus(III) compound added depends on the desired degree of stabilization. In general from 0.01 to 0.5% by weight, in particular from 0.05 to 0.5% by weight, based on the polymer, is added.

The sterically hindered phenols which can be used in accordance with the invention are likewise known stabilizers with respect to the thermooxidative ageing of plastics, especially polyolefins. The sterically hindered phenols contain, for example, at least one group of the formula XI

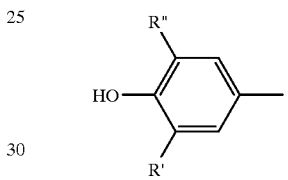
(XI)

in which

R' is hydrogen, methyl or tert-butyl; and

R" is substituted or unsubstituted alkyl or substituted or unsubstituted alkylthioalkyl.

A particularly suitable sterically hindered phenol is a compound of the formula XII

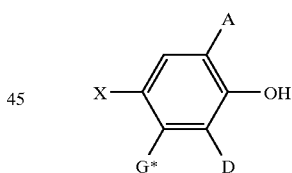
(XII)

in which

A is hydrogen, $C_1$–$C_{24}$alkyl, $C_5$–$C_{12}$cycloalkyl, phenyl-$C_1$–$C_4$alkyl, phenyl or a group

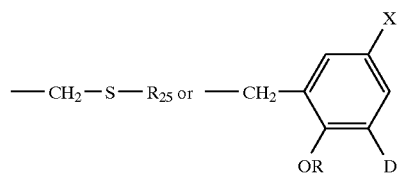

D is $C_1$–$C_{24}$alkyl, $C_5$–$C_{12}$cycloalkyl, phenyl-$C_1$–$C_4$alkyl, phenyl or a group —$CH_2$—S—$R_{25}$, X is hydrogen, $C_1$–$C_{18}$alkyl or one of the groups —$C_aH_{2a}$—$S_q$—$R_{26}$, —$C_bH_{2b}$—CO—O$R_{27}$, —$C_bH_{2b}$—CO—N($R_{29}$)($R_{30}$), —$CH_2$N($R_{34}$)($R_{35}$)

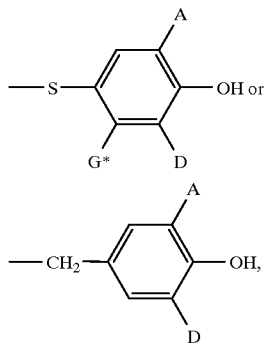

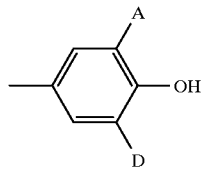

R is hydrogen or a group of the formula —CO—CH=CH$_2$,
G* is hydrogen or C$_1$-C$_{12}$alkyl,
R$_{25}$ is C$_1$-C$_{18}$alkyl, phenyl or a group —(CH$_2$)$_c$—CO—OR$_{28}$ or —CH$_2$CH$_2$OR$_{33}$,
R$_{26}$ is hydrogen, C$_1$-C$_{18}$alkyl, phenyl, benzyl or a group

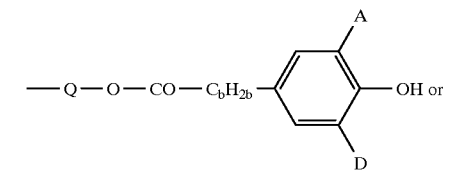

or is
—(CH$_2$)$_c$—CO—OR$_{28}$ or —CH$_2$—CH$_2$—OR$_{33}$,
R$_{27}$ is C$_1$-C$_{30}$alkyl or one of the groups —CHR$_{31}$—CH$_2$—S—R$_{32}$,

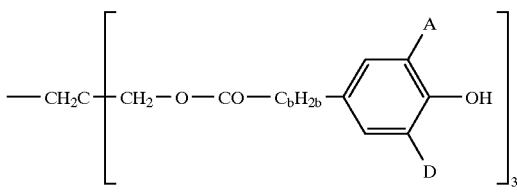

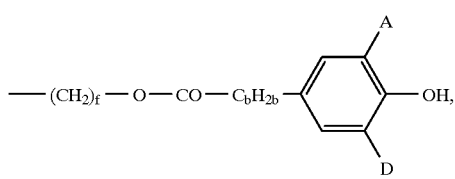

in which Q is C$_2$-C$_8$alkylene, C$_4$-C$_6$thiaalkylene or a group —CH$_2$CH$_2$(OCH$_2$CH$_2$)$_d$—,
R$_{28}$ is C$_1$-C$_{24}$alkyl,
R$_{29}$ is hydrogen, C$_1$-C$_{18}$alkyl or cyclohexyl,
R$_{30}$ is C$_1$-C$_{18}$alkyl, cyclohexyl, phenyl, C$_1$-C$_{18}$alkyl-substituted phenyl or one of the groups

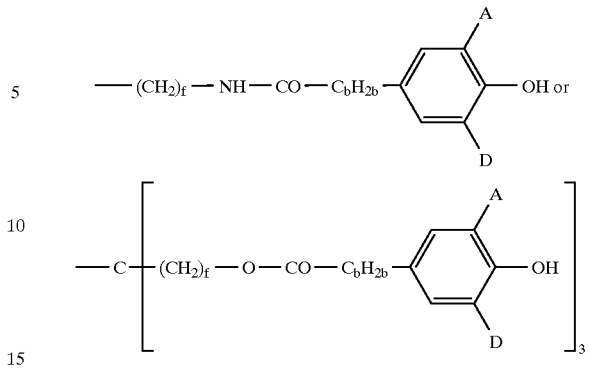

or R$_{29}$ and R$_{30}$ together are C$_4$-C$_8$alkylene which can be interrupted by —O— or —NH—,
R$_{31}$ is hydrogen, C$_1$-C$_4$alkyl or phenyl,
R$_{32}$ is C$_1$-C$_{18}$alkyl,
R$_{33}$ is hydrogen, C$_1$-C$_{24}$alkyl, phenyl, C$_2$-C$_{18}$alkanoyl or benzoyl,
R$_{34}$ is C$_1$-C$_{18}$alkyl, cyclohexyl, phenyl, C$_1$-C$_{18}$alkyl-substituted phenyl or a group

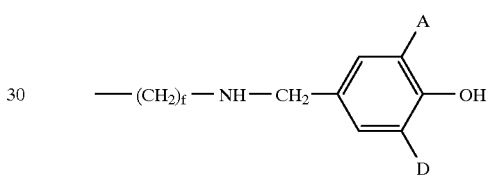

R$_{35}$ is hydrogen, C$_1$-C$_{18}$alkyl, cyclohexyl or a group

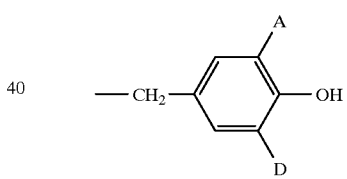

or R$_{34}$ and R$_{35}$ together are C$_4$-C$_8$alkylene which can be interrupted by —O— or —NH—,
a is, 1, 2 or 3, b is 0, 1,2 or 3, c is 1 or 2, d is 1 to 5,f is 2 to 8 and q is 1, 2, 3 or 4.
Preference is given to a compound of the formula XII in which
A is hydrogen, C$_1$-C$_8$alkyl, cyclohexyl, phenyl, or a group —CH$_2$—S—C$_1$-C$_8$alkyl or

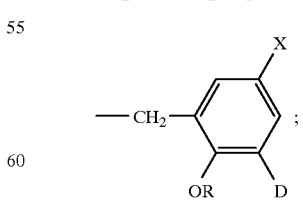

D is C$_1$-C$_8$alkyl, cyclohexyl, phenyl or a group —CH$_2$—S—C$_1$-C$_{18}$alkyl,
X is hydrogen, C$_1$-C$_8$alkyl or one of the groups —C$_a$H$_{2a}$—S$_q$—R$_{26}$, —C$_b$H$_{2b}$—CO—OR$_{27}$, —CH$_2$N(R$_{34}$)(R$_{35}$),

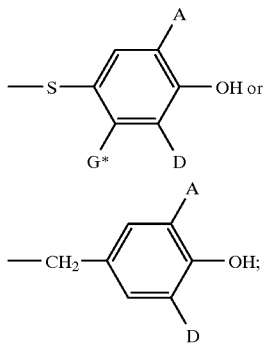

$R_{26}$ is $C_1$–$C_{12}$alkyl, phenyl or a group —$(CH_2)_c$—CO—$OR_{28}$, $R_{27}$ $C_1$–$C_{18}$alkyl or a group

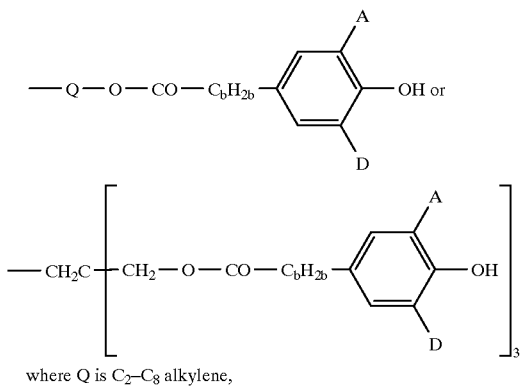

where Q is $C_2$–$C_8$ alkylene,

—$CH_2$—$CH_2$—S—$CH_2CH_2$— or a group —$CH_2CH_2$(OCH$_2$CH$_2$)$_d$—, $R_{28}$ is $C_1$–$C_{18}$alkyl, $R_{34}$ and $R_{35}$ independently of one another are hydrogen or $C_1$–$C_{12}$alkyl or $R_{34}$ and $R_{35}$ together are $C_4$–$C_8$alkylene which can be interrupted by —O— or —NH—, a is 1 or 2, b is 1 or 2,c is 1 or 2and d is 1,2 or 3.

Examples of preferred sterically hindered phenols are: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol],4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris-(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethylbenzene, bis(3,5-di-tert-butyl-4-hydroxybenzyl)sulfide, isooctyl 3,5-di-tert-butyl-4-hydroxybenzylmercaptoacetate, bis(4-tert-butyl-3-hydroxy-2,6-dimethylbenzyl)dithioterephthalate, 1,3,5-tris(3,5-di-tert-butyl-4-hydroxybenzyl) isocyanurate, 1,3,5-tris-(4-tert-butyl-3-hydroxy-2,6-dimethylbenzyl) isocyanurate, dioctadecyl 3,5-di-tert-butyl-4-hydroxybenzylphosphonate and the calcium salt of monoethyl 3,5-di-tert-butyl-4-hydroxybenzylphosphonate.

Particularly preferred sterically hindered phenols are compounds containing at least one group of the formula

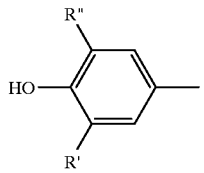

(XI)

in which

R' is methyl or tert-butyl; and

R" is substituted or unsubstituted alkyl or substituted or unsubstituted alkylthioalkyl.

Examples of such sterically hindered phenols are the esters of β-(3,5-di-tert-butyl-4-hydroxyphenyl)propionic acid and of β-(5-tert-butyl-4-hydroxy-3-methylphenyl) propionic acid with mono- or polyhydric alcohols, for example with methanol, octanol, octadecanol, 1,6-hexanediol, neopentylglycol, thiodiethylene glycol, diethylene glycol, triethylene glycol, pentaerythritol, tris (hydroxyethyl) isocyanurate and N,N'-bis(hydroxyethyl) oxalamide, and also the amides of these acids, for example N,N'-bis(3,5-Di-tert-butyl-4-hydroxyphenylpropionyl) hexamethylenediamine, N,N'-bis(3,5-Di-tert-butyl-4-hydroxyphenylpropionyl)trimethylenediamine and N,N'-bis(3,5-Di-tert-butyl-4-hydroxyphenylpropionyl)hydrazine.

Very particularly preferred sterically hindered phenols are 1,3,5-tris(3,5-Di-tert-butyl-4-hydroxybenzyl)-2,4,6-trimethylbenzene, 1,1,3-tris(5-tert-butyl-4-hydroxy-2-methylphenyl)butane and tocopherols (vitamin E).

In the context of the present invention, instead of a single sterically hindered phenol, it is also possible to use a mixture of different sterically hindered phenols.

The amount of sterically hindered phenol added depends on the desired degree of stabilization. In general from 0.01 to 0.5% by weight, in particular from 0.05 to 0.5% by weight, based on the polymer, is added.

The sterically hindered amines which can be used in accordance with the invention, preferably piperidine compounds, are known in particular as light stabilizers. These compounds comprise one or more groups of the formula XIII

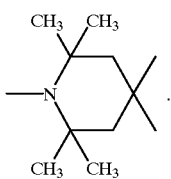

(XIII)

They may be compounds of relatively low (<700) or relatively high molecular weight. In the latter case, the products may also be oligomers or polymers. Preferred tetramethylpiperidine compounds are those having a molecular weight of more than 700 which contain no ester groups.

The following classes of tetramethylpiperidine compounds are of particular importance as stabilizers.

a) Compounds of the formula XIV

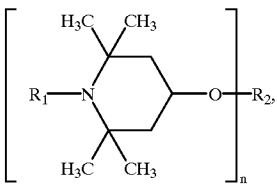

(XIV)

in which n is a number from 1 to 4, preferably 1 or 2, $R_1$ is hydrogen, oxyl, $C_1$–$C_{12}$alkyl, $C_3$–$C_8$alkenyl, $C_3$-$C_8$alkynyl, $C_7$–$C_{12}$aralkyl, $C_1$–$C_8$alkanoyl, $C_3$–$C_5$alkenoyl, glycidyl or a group —$CH_2CH(OH)$—Z in which Z is hydrogen, methyl or phenyl, where $R_1$ is preferably $C_1$–$C_4$alkyl, allyl, benzyl, acetyl or acryloyl, and $R_2$, if n is 1, is hydrogen, $C_1$–$C_{18}$alkyl which is uninterrupted or interrupted by one or more oxygen atoms, cyanoethyl, benzyl, glycidyl, a monovalent radical of an aliphatic, cycloaliphatic, aralipatic, unsaturated or aromatic carboxylic acid, carbamic acid or phosphorus-containing acid or a monovalent silyl radical, preferably a radical of an aliphatic carboxylic acid having 2 to 18 carbon atoms, a cycloaliphatic carboxylic acid having 7 to 15 carbon atoms, an α,β-unsaturated carboxylic acid having 3 to 5 carbon atoms or an aromatic carboxylic acid having 7 to 15 carbon atoms, or, if n is 2, is $C_1$–$C_{12}$alkylene, $C_4$–$C_{12}$alkenylene, xylylene, a divalent radical of an aliphatic, cycloaliphatic, aralipatic or aromatic dicarboxylic acid, dicarbamic acid or phosphorus-containing acid, or a divalent silyl radical, preferably a radical of an aliphatic dicarboxylic acid having 2 to 36 carbon atoms, a cycloaliphatic or aromatic dicarboxylic acid having 8–14 carbon atoms or an aliphatic, cycloaliphatic or aromatic dicarbamic acid having 8–14 carbon atoms, or, if n is 3, is a trivalent radical of an aliphatic, cycloaliphatic or aromatic tricarboxylic acid, an aromatic tricarbamic acid or a phosphorus-containing acid or a trivalent silyl radical, or, if n is 4, is a tetravalent radical of an aliphatic, cycloaliphatic or aromatic tetracarboxylic acid.

Any $C_1$–$C_{12}$alkyl substituents are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

$R_2$ as $C_1$–$C_{18}$alkyl can for example be the above-listed groups and also, for example, n-tridecyl, n-tetradecyl, n-hexadecyl or n-octadecyl.

$R_1$ as $C_3$–$C_8$alkenyl can for example be 1-propenyl, allyl, methallyl, 2-butenyl, 2-pentenyl, 2-hexenyl, 2-octenyl or 4-tert-butyl-2-butenyl.

$R_1$ as $C_3$–$C_8$alkynyl is preferably propargyl. $R_1$ as $C_7$–$C_{12}$aralkyl is particularly phenethyl and especially benzyl.

$R_1$ as $C_1$–$C_8$alkanoyl is for example formyl, propionyl, butyryl or octanoyl, but preferably acetyl, and as $C_3$–$C_5$alkenoyl is especially acryloyl. $R_2$ as the monovalent radical of a carboxylic acid is for example an acetic, caproic, stearic, acrylic, methacrylic, benzoic or β-(3,5-Di-tert-butyl-4-hydroxyphenyl)propionic acid radical.

$R_2$ as the divalent radical of a dicarboxylic acid is for example a malonic, succinic, glutaric, adipic, subiric, sebacic, maleic, phthalic, dibutylmalonic, dibenzylmalonic, butyl(3,5-Di-tert-butyl-4-hydroxybenzyl)malonic or bicycloheptenedicarboxylic acid radical.

$R_2$ as the trivalent radical of a tricarboxylic acid is for example a trimellitic or nitrilotriacetic acid radical.

$R_2$ as the tetravalent radical of a tetracarboxylic acid is for example the tetravalent radical of 1,2,3,4-butanetetracarboxylic acid or of pyromellitic acid.

$R_2$ as the divalent radical of a dicarbamic acid is for example a hexamethylenedicarbamic or 2,4-tolylenedicarbamic acid radical.

Examples of polyalkylpiperidine compounds from this class are the following compounds:

1) 4-Hydroxy-2,2,6,6-tetramethylpiperidine
2) 1-Allyl-4-hydroxy-2,2,6,6-tetramethylpiperidine
3) 1-Benzyl-4-hydroxy-2,2,6,6-tetramethylpiperidine
4) 1-(4-tert-butyl-2-butenyl)-4-hydroxy-2,2,6,6-tetramethylpiperidine
5) 4-Stearoyloxy-2,2,6,6-tetramethylpiperidine
6) 1-Ethyl4-salicyloyloxy-2,2,6,6-tetramethylpiperidine
7) 4-Methacryloyloxy-1,2,2,6,6-pentamethylpiperidine
8) 1,2,2,6,6-Pentamethylpiperidin-4-yl β-(3,5-Di-tert-butyl-4hydroxyphenyl)propionate
9) Di(1-benzyl-2,2,6,6-tetramethylpiperidin-4-yl) maleate
10) Di(2,2,6,6-tetramethylpiperidin-4-yl) succinate
11) Di(2,2,6,6-tetramethylpiperidin-4-yl) glutarate
12) Di(2,2,6,6-tetramethylpiperidin-4-yl) adipate
13) Di(2,2,6,6-tetramethylpiperidin-4-yl) sebacate
14) Di(1,2,2,6,6-pentamethylpiperidin-4-yl) sebacate
15) Di(1,2,3,6-tetramethyl-2,6-diethylpiperidin-4-yl) sebacate
16) Di(1-allyl-2,2,6,6-tetramethylpiperidin-4-yl) phthalate
17) 1-Propargyl-4-β-cyanoethyloxy-2,2,6,6-tetramethylpiperidine
18) 1-Acetyl-2,2,6,6-tetramethylpiperidin-4-yl acetate
19) Tri(2,2,6,6-tetramethylpiperidin-4-yl) trimellitate
20) 1-Acryloyl-4-benzyloxy-2,2,6,6-tetramethylpiperidine
21) Di(2,2,6,6-tetramethylpiperidin-4-yl) diethylmalonate
22) Di(1,2,2,6,6-pentamethylpiperidin-4-yl) dibutylmalonate
23) Di(1,2,2,6,6-pentamethylpiperidin-4-yl) butyl(3,5-Di-tert-butyl4-hydroxybenzyl)malonate
24) Di(1,2,2,6,6-pentamethylpiperidin-4-yl) dibenzylmalonate
25) Di(1,2,3,6-tetramethyl-2,6-diethylpiperidin-4-yl) dibenzylmalonate
26) Hexane-1',6'-bis(4-carbamoyloxy-1-n-butyl-2,2,6,6-tetramethylpiperidine)
27) Toluene-2',4'-bis(4-carbamoyloxy-1-n-propyl-2,2,6,6-tetramethylpiperidine)
28) Dimethylbis(2,2,6,6-tetramethylpiperidin-4-oxy)silane
29) Phenyltris(2,2,6,6-tetramethylpiperidin-4-oxy)silane
30) Tris(1-propyl-2,2,6,6-tetramethylpiperidin-4-yl) phosphite
31) Tris(1-propyl-2,2,6,6-tetramethylpiperidin-4-yl) phosphate 32) Phenyl[bis-(1,2,2,6,6-pentamethylpiperidin-4-yl) phosphonate
33) 4-Hydroxy-1,2,2,6,6-pentamethylpiperidine
34) 4-Hydroxy-N-hydroxyethyl-2,2,6,6-tetramethylpiperidine
35) 4-Hydroxy-N-(2-hydroxypropyl)-2,2,6,6-tetramethylpiperidine
36) 1-Glycidyl-4-hydroxy-2,2,6,6-tetramethylpiperidine b) Compounds of the formula (XV)

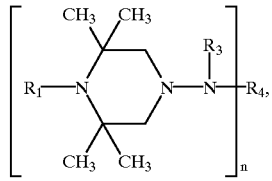

(XV)

in which n is the number 1 or 2, $R_1$ is as defined under a), $R_3$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl or benzoyl, and $R_4$, if n is 1, is hydrogen, $C_1$–$C_{18}$alkyl, $C_3$–$C_8$alkenyl, $C_5$–$C_7$cycloalkyl, $C_1$–$C_4$alkyl substituted with a hydroxyl, cyano, alkoxycarbonyl or carbamide group, glycidyl, a group of the formula —$CH_2$—CH(OH)—Z or of the formula —CONH—Z, where Z is hydrogen, methyl or phenyl; or, if n is 2, is $C_2$–$C_{12}$alkylene, $C_6$–$C_{12}$arylene, xylylene, a —$CH_2$—CH(OH)—$CH_2$— group or a group —$CH_2$—CH(OH)—$CH_2$—O—D—O— in which D is $C_2$–$C_{10}$alkylene, $C_6$–$C_{15}$arylene or $C_6$–$C_{12}$cycloalkylene, or, with the proviso that $R_3$ is not alkanoyl, alkenoyl or benzoyl, $R_4$ can also be a divalent radical of an aliphatic, cycloaliphatic or aromatic dicarboxylic acid or dicarbamic acid or else the group —CO—, or, if n is 1, $R_3$ and $R_4$ together can be the divalent radical of an aliphatic, cycloaliphatic or aromatic 1,2- or 1,3-dicarboxylic acid.

Any $C_1$–$C_{12}$alkyl or $C_1$–$C_{18}$alkyl substituents are as already defined under a).

Any $C_5$–$C_7$cycloalkyl substituents are in particular cyclohexyl.

$R_3$ as $C_7$–$C_8$aralkyl is particularly phenylethyl or especially benzyl. $R_3$ as $C_2$–$C_5$hydroxyalkyl is, in particular, 2-hydroxyethyl or 2-hydroxypropyl.

$R_3$ as $C_2$–$C_{18}$alkanoyl is for example propionyl, butyryl, octanoyl, dodecanoyl, hexadecanoyl or octadecanoyl, but preferably acetyl, and as $C_3$–$C_5$alkenoyl is in particular acryloyl.

$R_4$ as $C_2$–$C_8$alkenyl is for example allyl, methallyl, 2-butenyl, 2-pentenyl, 2-hexenyl or 2-octenyl.

$R_4$ as $C_1$–$C_4$alkyl substituted with a hydroxyl, cyano, alkoxycarbonyl or carbamide group can for example be 2-hydroxyethyl, 2-hydroxypropyl, 2-cyanoethyl, methoxycarbonylmethyl, 2-ethoxycarbonylethyl, 2-aminocarbonylpropyl or 2(dimethylaminocarbonyl)ethyl.

Any $C_2$–$C_{12}$alkylene substituents are for example ethylene, propylene, 2,2-dimethylpropylene, tetramethylene, hexamethylene, octamethylene, decamethylene or dodecamethylene.

Any $C_6$–$C_{15}$arylene substituents are for example o-, m- or p-phenylene, 1,4-naphthylene or 4,4'-diphenylene.

D as $C_6$–$C_{12}$cycloalkylene is in particular cyclohexylene.

Examples of polyalkylpiperidine compounds from this class are the following compounds:

37) N,N'-bis(2,2,6,6-Tetramethylpiperidin-4-yl) hexamethylene-1,6-diamine
38) N,N'-bis(2,2,6,6-Tetramethylpiperidin-4-yl) hexamethylene-1,6-diacetamide
39) 1-Acetyl-4-(N-cyclohexylacetamido)-2,2,6,6-tetramethylpiperidine
40) 4-Benzoylamino-2,2,6,6-tetramethylpiperidine
41) N,N'-Bis(2,2,6,6-tetramethylpiperidin-4-yl)-N,N'-dibutyladipamide
42) N,N'-Bis(2,2,6,6-tetramethylpiperidin-4-yl)-N,N'-dicyclohexyl-2-hydroxypropylene-1,3-diamine
43) N,N'-Bis(2,2,6,6-tetramethylpiperidin-4-yl)-p-xylylenediamine
44) N,N'-Bis(2,2,6,6-tetramethylpiperidin-4-yl) succindiamide
45) Di(2,2,6,6-tetramethylpiperidin-4-yl) N-(2,2,6,6-tetramethylpiperidin-4-yl)-β-aminodipropionate 46) The compound of the formula

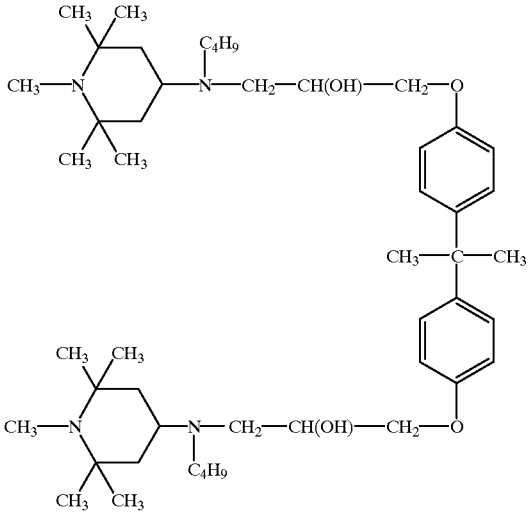

47) 4-(Bis-2-hydroxyethylamino)-1,2,2,6,6-pentamethylpiperidine
48) 4-(3-Methyl-4-hydroxy-5-tert-butyl-benzamido)-2,2,6,6-tetramethylpiperidine
49) 4-Methacrylamido-1,2,2,6,6-pentamethylpiperidine c) Compounds of the formula (XVI)

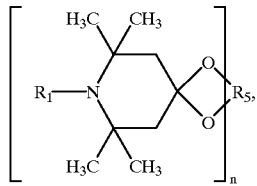

(XVI)

in which n is the number 1 or 2, $R_1$ is as defined under a) and $R_5$, if n is 1, is $C_2$–$C_8$alkylene or $C_2$–$C_8$hydroxyalkylene or $C_4$–$C_{22}$acyloxyalkylene, or, if n is 2, is the group (—$CH_2$)$_2$ ($CH_2$—)$_2$.

$R_5$ as $C_2$–$C_8$alkylene or $C_2$–$C_8$hydroxyalkylene is for example ethylene, 1-methylethylene, propylene, 2-ethylpropylene or 2-ethyl-2-hydroxymethylpropylene.

$R_5$ as $C_4$–$C_{22}$acyloxyalkylene is for example 2-ethyl-2-acetoxymethylpropylene.

Examples of polyalkylpiperidine compounds from this class are the following compounds:

50) 9-Aza-8,8,10,10-tetramethyl-1,5-dioxaspiro[5.5] undecane
51) 9-Aza-8,8,10,10-tetramethyl-3-ethyl-1,5-dioxaspiro [5.5]undecane
52) 8-Aza-2,7,7,8,9,9-hexamethyl-1,4-dioxaspiro[4.5] decane
53) 9-Aza-3-hydroxymethyl-3-ethyl-8,8,9,10,10-pentamethyl-1,5-dioxaspiro[5.5]undecane 54) 9-Aza-3-ethyl-3-acetoxymethyl-9-acetyl-8,8,10,10-tetramethyl-1,5-dioxaspiro[5.5]undecane
55) 2,2,6,6-Tetramethylpiperidine-4-spiro-2'-(1',3'-dioxane)-5'-spiro-5'-(1'',3'- dioxane)-2''-spiro-4''-(2''',2''',6''', 6'''-tetramethylpiperidine).

d) Compounds of the formulae XVIa, XVIb and XVIc

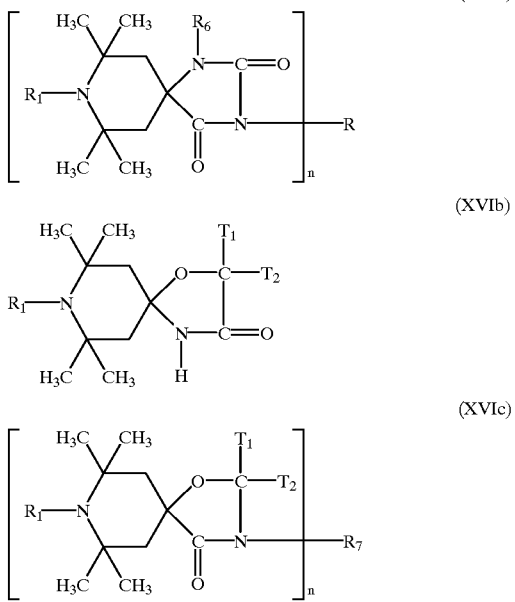

in which n is the number 1 or 2, $R_1$ is as defined under a), $R_6$ is hydrogen, $C_1$–$C_{12}$alkyl, allyl, benzyl, glycidyl or $C_2$–$C_6$alkoxyalkyl and $R_7$, if n is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —$(CH_2)_p$—COO—Q or of the formula —$(CH_2)_p$—O—CO—Q, where p is 1 or 2 and Q is $C_1$–$C_4$alkyl or phenyl, or, if n is 2, is $C_2$–$C_{12}$alkylene, $C_4$–$C_{12}$alkenylene, $C_6$–$C_{12}$arylene, a group —$CH_2$—CH(OH)—$CH_2$—O—D—O—$CH_2$—CH(OH)—$CH_2$— in which D is $C_2$–$C_{10}$alkylene, $C_6$–$C_{15}$arylene, $C_6$–$C_{12}$cycloalkylene, or is a group —$CH_2$CH(OZ')CH_2$—(OCH_2$—CH(OZ')CH_2)_2$— in which Z' is hydrogen, $C_1$–$C_{18}$alkyl, allyl, benzyl, $C_2$–$C_{12}$alkanoyl or benzoyl, $T_1$ and $T_2$ independently of one another are hydrogen, $C_1$–$C_{18}$alkyl or unsubstituted or halogen- or $C_1$–$C_4$alkyl-substituted $C_6$–$C_{10}$aryl or $C_7$–$C_9$aralkyl or $T_1$ and $T_2$, together with the carbon atom joining them, form a $C_5$–$C_{12}$cycloalkane ring.

Any $C_1$–$C_{12}$alkyl substituents are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents can for example be the above-listed groups and also, for example, n-tridecyl, n-tetradecyl, n-hexadecyl or n-octadecyl.

Any $C_2$-$C_6$alkoxyalkyl substituents are for example methoxymethyl, ethoxymethyl, propoxymethyl, tert-butoxymethyl, ethoxyethyl, ethoxypropyl, n-butoxyethyl, tertbutoxyethyl, isopropoxyethyl or propoxypropyl.

$R_7$ as $C_3$–$C_5$alkenyl is for example 1-propenyl, allyl, methallyl, 2-butenyl or 2-pentenyl.

$R_7$, $T_1$ and $T_2$ as $C_7$–$C_9$aralkyl are particularly phenethyl or especially benzyl. Where $T_1$ and $T_2$ together with the carbon atom form a cycloalkane ring, this can for example be a cyclopentane, cyclohexane, cyclooctane or cyclododecane ring.

$R_7$ as $C_2$–$C_4$hydroxyalkyl is for example 2-hydroxyethyl, 2-hydroxypropyl, 2-hydroxybutyl or 4-hydroxybutyl.

$R_7$, $T_1$ and $T_2$ as $C_6$–$C_{10}$aryl are particularly phenyl, α- or β-naphthyl, which are unsubstituted or substituted with halogen or $C_1$–$C_4$alkyl.

$R_7$ as $C_2$–$C_{12}$alkylene is for example ethylene, propylene, 2,2-dimethylpropylene, tetramethylene, hexamethylene, octamethylene, decamethylene or dodecamethylene.

$R_7$ as $C_4$–$C_{12}$alkenylene is particularly 2-butenylene, 2-pentenylene or 3-hexenylene.

$R_7$ as $C_6$–$C_{12}$-arylene is for example o-, m- or p-phenylene, 1,4-naphthylene or 4,4'-diphenylene.

Z' as $C_2$–$C_{12}$alkanoyl is for example propionyl, butyryl, octanoyl or dodecanoyl, but preferably acetyl.

D as $C_2$–$C_{10}$alkylene, $C_6$–$C_{15}$arylene or $C_6$–$C_{12}$cycloalkylene is as defined under b).

Examples of polyalkylpiperidine compounds from this class are the following compounds:

56) 3-Benzyl-1,3,8-triaza-7,7,9,9-tetramethylspiro[4.5]decane-2,4-dione
57) 3-n-Octyl-1,3,8-triaza-7,7,9,9-tetramethylspiro[4.5]decane-2,4-dione
58) 3-Allyl-1,3,8-triaza-1,7,7,9,9-pentamethylspiro[4.5]decane-2,4-dione
59) 3-Glycidyl-1,3,8-triaza-7,7,8,9,9-pentamethylspiro[4.5]decane-2,4-dione
60) 1,3,7,7,8,9,9-Heptamethyl-1,3,8-triazaspiro[4.5]decane-2,4-dione
61) 2-Isopropyl-7,7,9,9-tetramethyl-1-oxa-3,8-diaza-4-oxospiro[4.5]decane
62) 2,2-Dibutyl-7,7,9,9-tetramethyl-1-oxa-3,8-diaza-4-oxospiro[4.5]decane
63) 2,2,4,4-Tetramethyl-7-oxa-3,20-diaza-21-oxodispiro[5.1.11.2]heneicosane
64) 2-Butyl-7,7,9,9-tetramethyl-1-oxa-4,8-diaza-3-oxospiro[4.5]decane
65) 8-Acetyl-3-dodecyl-1,3,8-triaza-7,7,9,9-tetramethylspiro[4.5]decane-2,4-dione or the compounds of the following formulae:

66)

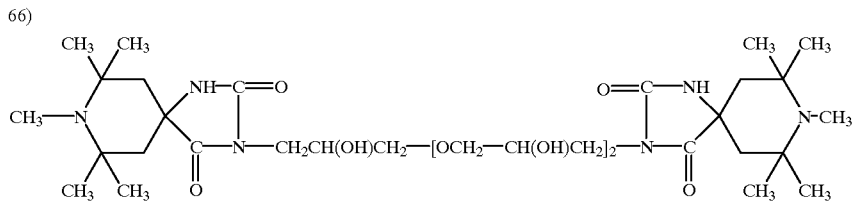

67)
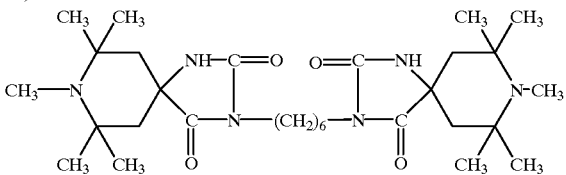

68)
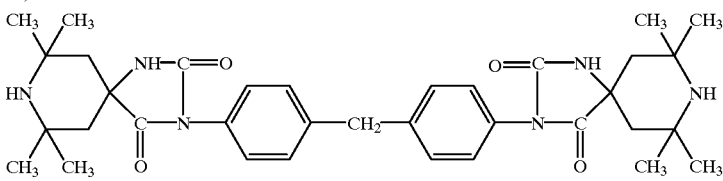

69)
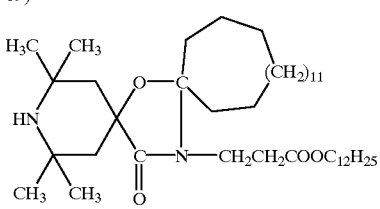

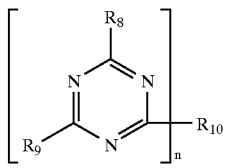
(XVII)

in which n is the number 1 or 2 and $R_8$ is the group of the formula

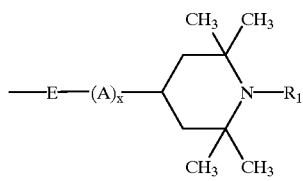

in which $R_1$ is as defined under a), E is —O— or —$NR_{11}$—, A is $C_2$–$C_6$alkylene or —(CH$_2$)$_3$—O— and x is the number 0 or 1, $R_9$ is identical to $R_8$ or is one of the groups '$NR_{11}R_{12}$, —$OR_{13}$, —$NHCH_2OR_{13}$ or —$N(CH_2OR_{13})_2$, $R_{10}$, if n is 1, is identical to $R_8$ or $R_9$ and, if n is 2, is a group E—B—E in which B is $C_2$–$C_6$alkylene which is uninterrupted or interrupted by —$N(R_{11})$—, $R_{11}$ is $C_1$–$C_{12}$alkyl, cyclohexyl, benzyl or $C_1$–$C_4$hydroxyalkyl or a group of the formula

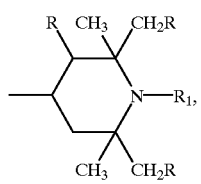

$R_{12}$ is $C_1$–$C_{12}$alkyl, cyclohexyl, benzyl, $C_1$–$C_4$hydroxyalkyl and $R_{13}$ is hydrogen, $C_1$–$C_{12}$alkyl or phenyl, or $R_{11}$ and $R_{12}$ together are $C_4$–$C_5$alkylene or $C_4$–$C_5$oxaalkylene, for example a group of the formula

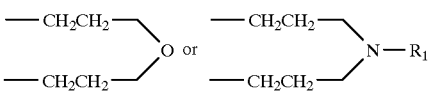

or else $R^{11}$ and $R^{12}$ are each a group of the formula

Any $C_1$–$C_{12}$ alkyl substituents are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents are for example 2-hydroxyethyl, 2-hydroxypropyl, 3-hydroxypropyl, 2-hydroxybutyl or 4-hydroxybutyl.

A as $C_2$–$C_6$alkylene is for example ethylene, propylene, 2,2-dimethylpropylene, tetramethylene or hexamethylene.

$R_{11}$ and $R_{12}$ together as $C_4$–$C_5$alkylene or $C_4$–$C_5$oxalkylene are for example tetramethylene, pentamethylene or 3-oxapentamethylene.

Examples of polyalkylpiperidine compounds from this class are the compounds of the following formulae:
70)
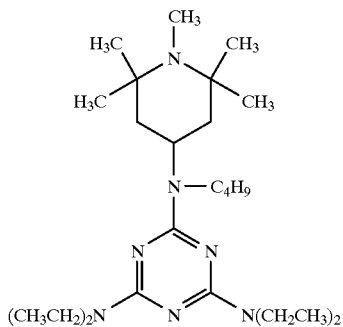
71)
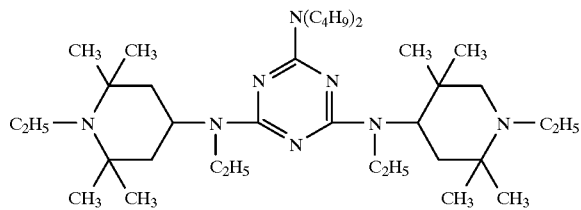
72)
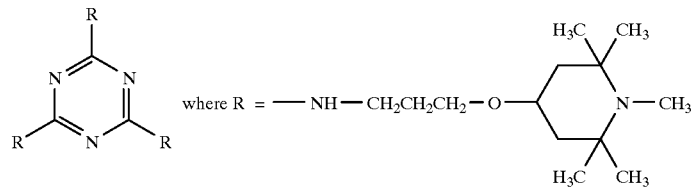
73)
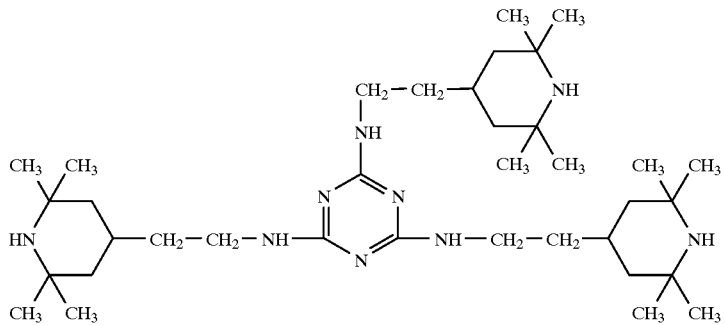
74)
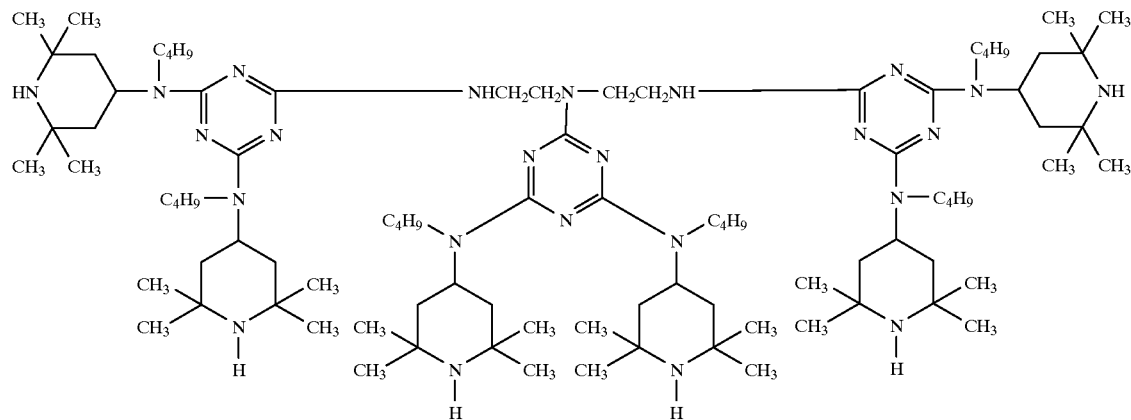

75)
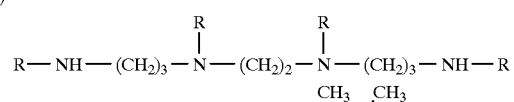
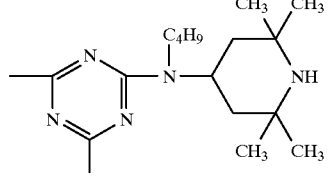
where R = 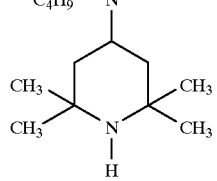
76)
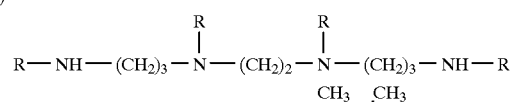
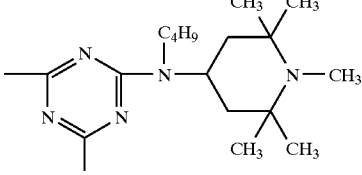
where R = 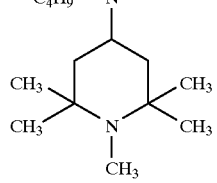
77)
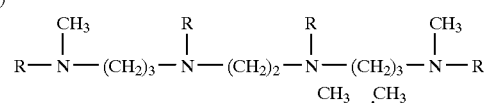
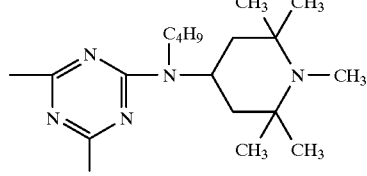
where R = 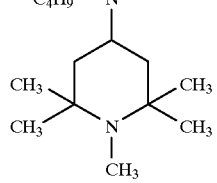

78) 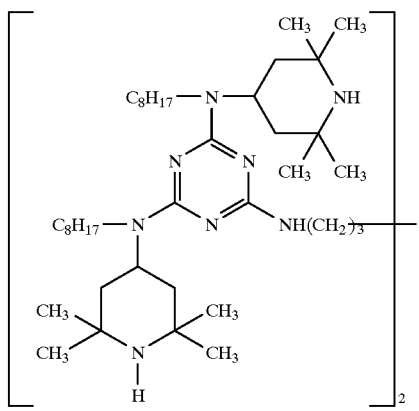

79) 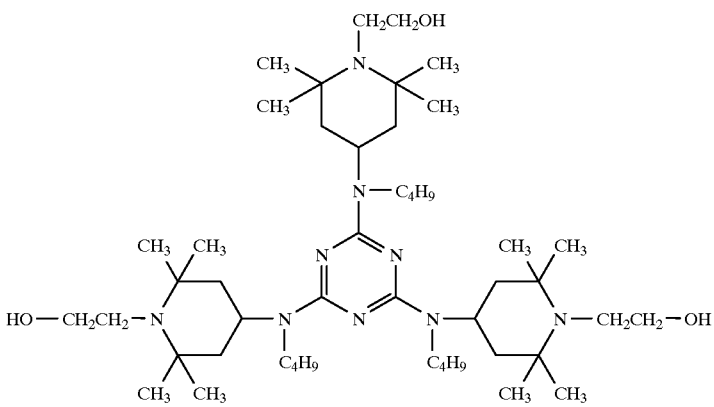

80) 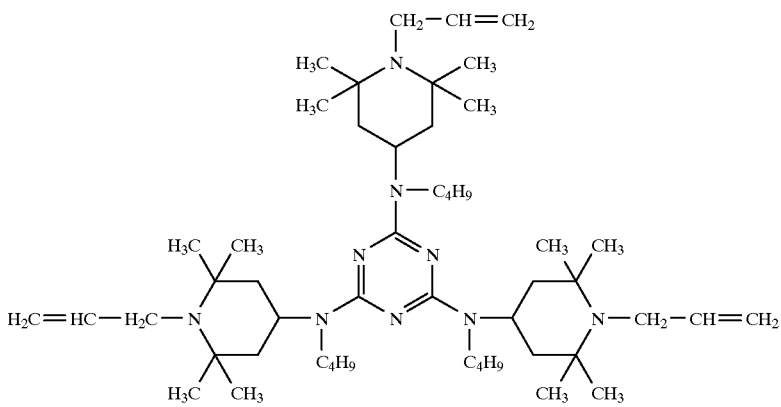

f) Oligomeric or polymeric compounds whose structural repeating unit comprises one or more 2,2,6,6-tetraalkylpiperidine radicals of the formula (XIII), especially polyesters, polyethers, polyamides, polyamines, polyurethanes, polyureas, polyaminotriazines, poly(meth)acrylates, polysiloxanes, poly(meth)acrylamides, and copolymers thereof which comprise such radicals.

Examples of 2,2,6,6-polyalkylpiperidine light stabilizers from this class are the compounds of the following formulae, in which m is a number from 2 to about 200.

81) 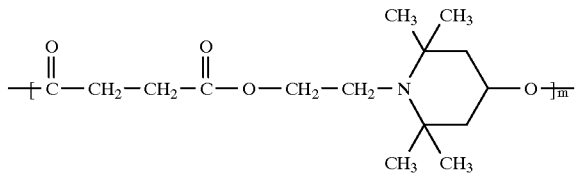
82) 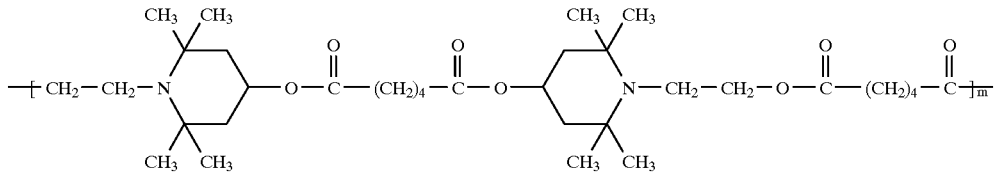
83) 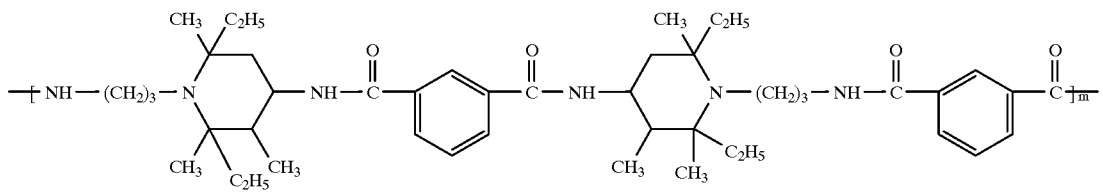
84) 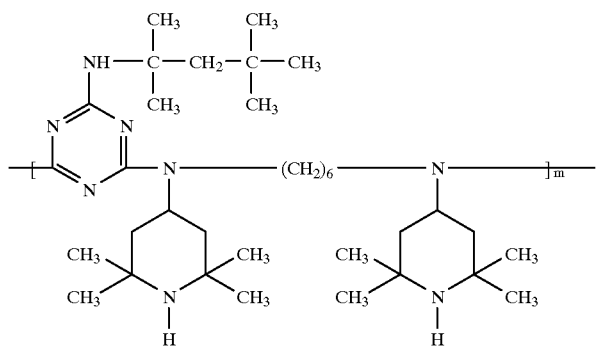
85) 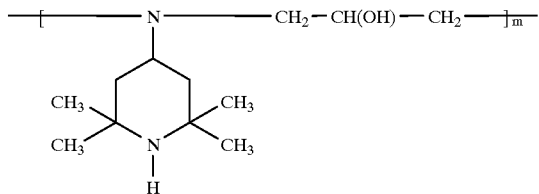
86) 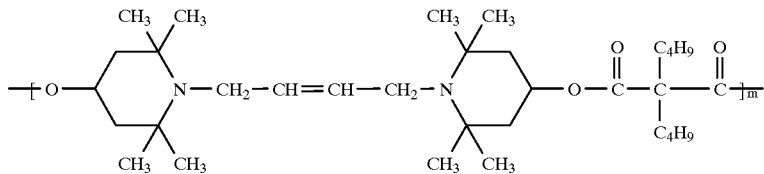

87) 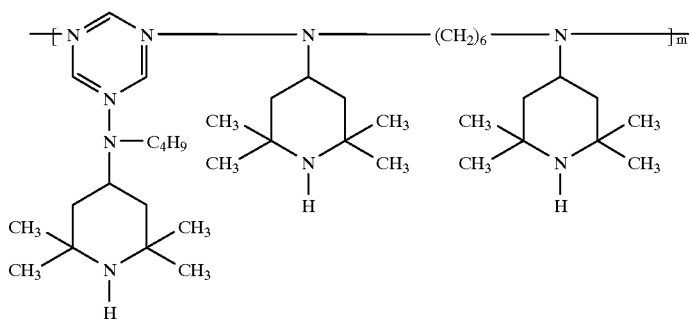
88) 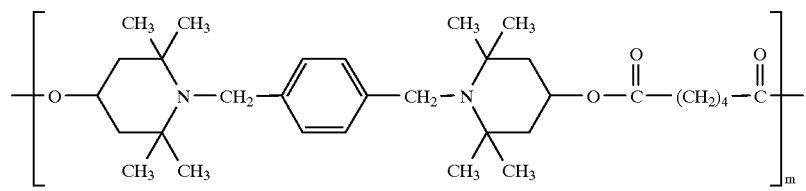
89) 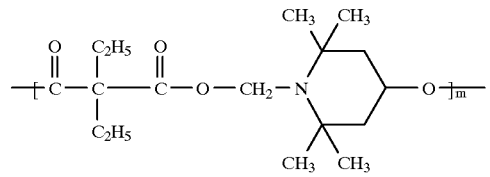
90) 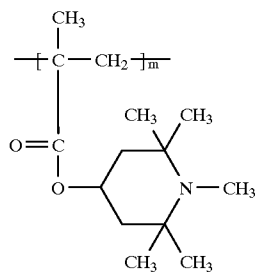
91) 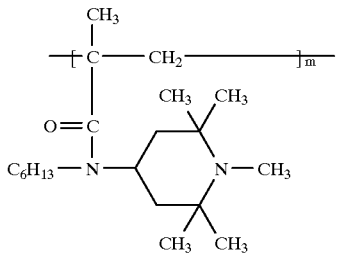

92) 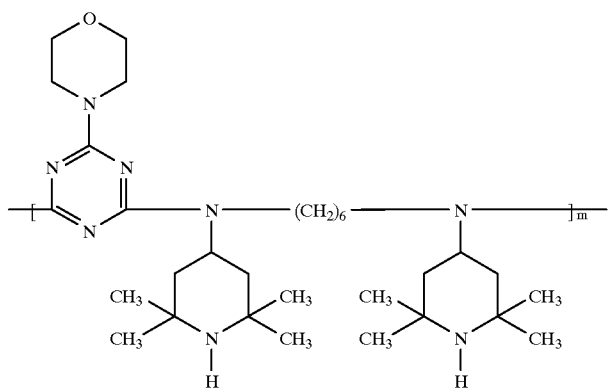
93) 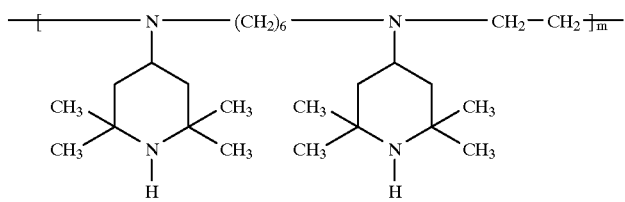
94) 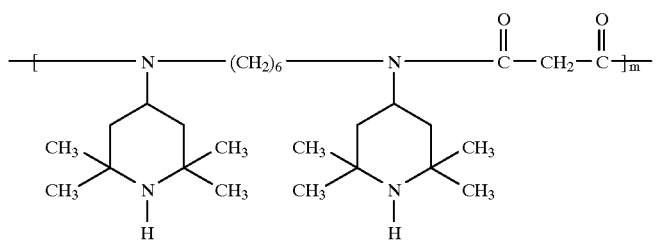
95) 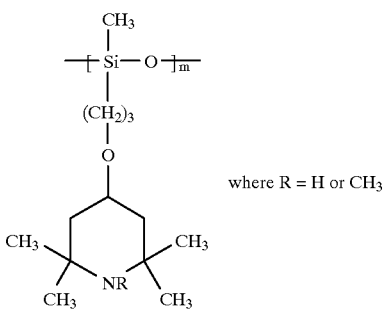
where R = H or CH$_3$

96)

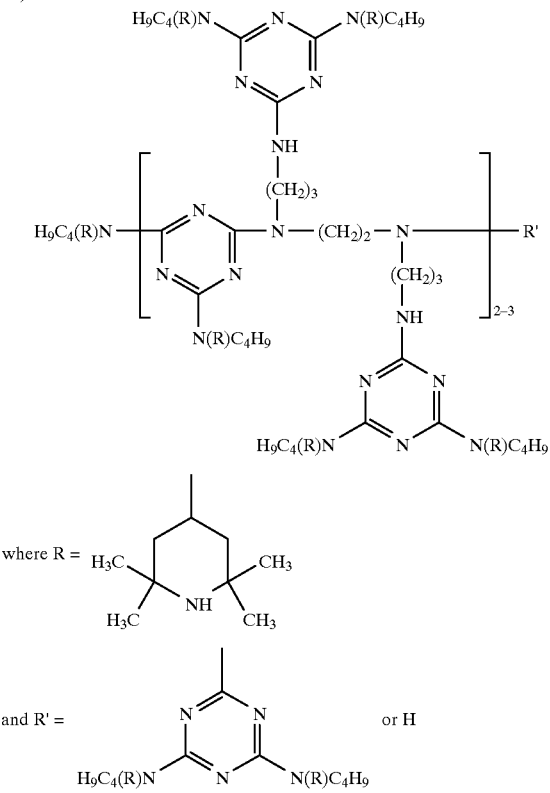

{obtainable by reacting the product of reaction of trichlorotriazine and $NH_2-(CH_2)_3-NH-(CH_2)_2-(CH_2)_3-NH_2$ with 4-N-butyl-2,2,6,6-tetramethylpiperidine}

Among these classes, classes e) and f) are particularly suitable, especially those tetraalkylpiperidine compounds which contain s-triazine groups. Other compounds which are particularly appropriate are the compounds 74, 76, 84, 87, 92, 95 and 96.

In the context of the present invention, instead of a single sterically hindered amine it is also possible to use a mixture of different sterically hindered amines.

The amount of sterically hindered amine added depends on the desired degree of stabilization. In general from 0.01 to 0.5% by weight, in particular from 0.05 to 0.5% by weight, based on the polymer, is added.

The acid scavenger which can be used in accordance with the invention is preferably a compound which does not liberate water under the reaction conditions and which is from the series consisting of hydrotalcites, zeolites, metal soaps, metal carbonates and metal oxides.

The compounds which can be used from the series consisting of the hydrotalcites, zeolites, metal soaps, metal carbonates and metal oxides include both naturally occurring minerals and synthetically prepared compounds.

Compounds from the series consisting of the hydrotalcites can be represented by the general formula XVIII $$M^{2+}_{1-x}\cdot M^{3+}_x\cdot(OH)_2\cdot(A^{n-})_{x/n}\cdot mH_2O \quad \text{(XVIII)}$$

in which
$M^{2+} = Mg^{2+}, Ca^{2+}, Sr^{2+}, Ba^{2+}, Zn^{2+}, Cd^{2+}, Pb^{2+}, Sn^{2+}$ and/or $Ni^{2+}$,
$M^{3+} = Al^{3+}, B^{3+}$ or $Bi^{3+}$,
$A^{n-}$ is an anion of valency n,
n is 1–4,
x is 0–0.5 and
m is 0–20.

$A^{n-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $[OC(O)C(O)O]^{2-}$, $(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$.

Other hydrotalcites which can expediently be employed in the process as described above are compounds bearing the general formula $$M^{2+}_x\cdot Al_2(OH)_{2x+6nz}\cdot(A^{n-})_2\cdot mH_2O \quad \text{(XVIIIa)}$$

in which formula XVIIa $M^{2+}$ is at least one metal from the series consisting of Mg and Zn and is preferably $Mg^{2+}$, $A^{n-}$ is an anion, for example from the series consisting of $CO_3^{2-}$, $[OC(O)C(O)O]^{2-}$, $OH^-$ and $S^{2-}$, where n is the valency of the anion, m is a positive number which is preferably from 0.5 to 15, and x and z are positive numbers, x preferably being from 2 to 6 and z being less than 2.

Preferred and commercially available hydrotalcites are, for example, DHT-4A and DHT-4C from Kyowa, Japan.

Preferred compounds are those from the series consisting of the hydrotalcites of the general formula (XVIII)

$$M^{2+}_{1-x}\cdot M^{3+}_x\cdot(OH)_2\cdot(A^{n-})_{x/n}\cdot mH_2O \quad \text{(XVIII)}$$

in which $M^{2+}$ is $Mg^{2+}$ or a solid solution of Mg and Zn, $A^{n-}$ is $CO_3^{2-}$, x is from 0 to 0.5 and m is from 0 to 20.

Very particularly preferred hydrotalcites are those of the formula $$Al_2O_3\cdot 6MgO\cdot CO_2\cdot 12H_2O,$$

$Mg_{4.5}\cdot Al_2\cdot (OH)_{13}\cdot CO_3\cdot 3{,}5H_2O$, $4MgO\cdot Al_2O_3\cdot CO_2\cdot 9H_2O$, $4MgO\cdot Al_2O_3\cdot CO_2\cdot 6H_2O$, $ZnO\cdot 3MgO\cdot Al_2O_3\cdot CO_2\cdot 8-9H_2O$ or $ZnO\cdot 3MgO\cdot Al_2O_3\cdot CO_2\cdot 5-6H_2O$.

In accordance with the invention it is also possible to use zeolites of the general formula (XIX)

$$M_{x/n}[(AlO_2)_x SiO_2)_y]\cdot wH_2O \qquad (XIX)$$

in which
n is the charge on the cation M,
M is an element of the first or second main group,
y:x is between 0.8 and 1.2 and
w is between 0.5 and 30.

Preferred zeolites which are known per se which can be employed in the above process have an average effective pore diameter of 3–5 Å in which context those of the type NaA, which have an average effective pore diameter of 4 Å, are accordingly also referred to as zeolites 4A.

Examples of suitable zeolites are the compounds:

$Na_{12}[(AlO_2)_{12}(SiO_2)_{12}]\cdot 12H_2O$ $Ca_{4.5}Na_3[(AlO_2)_{12}(SiO_2)_{12}]\cdot 30H_2O$ $KgNa_3[(AlO_2)_{12}(SiO_2)_{12}]\cdot 27H_2O$ Preferred and commercially available zeolites are molecular sieves.

In accordance with the invention it is also possible to use metal soaps. Preferred metal soaps are those of divalent metals with fatty acids having 8–28 carbon atoms. Metal soaps of calcium are particularly preferred, with very particular preference being given to calcium stearate and calcium pelargonate.

In accordance with the invention it is also possible to use metal carbonates or metal oxides. Preferred oxides are those of divalent metals. Particularly preferred oxides are those of metals of the second main group or subgroup, with zinc oxide and magnesium oxide being very particularly preferred.

The compounds which can be employed in accordance with the invention are dried at 50–800° C., preferably 80–400° C., in order to remove water which is bound not at all or only weakly, insofar as they are not already sufficiently dry and have not already been stored with the exclusion of moisture. Drying can be carried out under vacuum or inert gas. The surfaces of the substances can be treated with surface-active reagents, such as carboxylic acids, for example stearic acid, or linear alcohols having 8 or more carbon atoms.

In the context of the present invention, instead of an individual acid scavenger it is also possible to use a mixture of different acid scavengers. The compounds which do not liberate water under the reaction conditions and which come from the series consisting of the hydrotalcites, zeolites, metal soaps, metal carbonates, metal oxides or similar synthetically prepared compounds are generally added in an amount of from 0.005 to 0.2% by weight, based on the polymer, preferably in amount of from 0.01 to 0.1% by weight.

A particularly preferred embodiment of the invention comprises carrying out the above process with the addition of a phosphorus(lll) compound and a sterically hindered phenol. Additionally preferred is a process in which a phosphorus(II) compound, a sterically hindered phenol and a sterically hindered amine are added. It is very particularly preferred to use a combination of phosphorus(II) compound, sterically hindered phenol, sterically hindered amine and acid scavenger. As regards the combinations mentioned, the preferred combinations consist of the specific compounds which are preferred in each case.

The addition of the compounds, individually or else in the form of mixtures, is usually made after at least 0.1%, preferably at least 1% and with particular preference at least 10%, of the conversion of polymer has been reached, based on the overall yield. The present invention additionally provides for the use of at least one of the above-defined phosphorus(III) compounds, sterically hindered phenols, sterically hindered amines and/or acid scavengers defined in more detail above in a process for the polymerization of olefins on a transition metallocene catalyst in order to stabilize the polymers which can be obtained in this way. In this context, the preferences of the process apply analogously.

The present invention provides, furthermore, the polyolefins which are obtainable by the process defined in more detail above. In this context, the preferences of the process apply analogously.

The polyolefins prepared in accordance with the invention are particularly suitable for the production of semifinished goods (plates, pipes and profiles of any desired cross-section) and for the following production processes: rotational moulding, centrifugal casting, injection moulding, structural foam moulding of thermoplastics, transfer moulding, compression moulding, sintering, calendering, extrusion, blow moulding, extrusion stretch blow moulding, casting of hollow articles, spinning, foaming, powder coating, coating and cable sheathing.

The definitions of the radicals $R_1$–$R_{35}$, R', $M_1$, $M_2$, A, L, Q, X and of the indices a, n, m, p, q, y, z, w may occur more than once in the description, and relate in each case to the formula given directly beforehand.

The examples which follow illustrate the process in more detail. In these examples and in the remainder of the description and in the claims, parts and percentages are by weight,

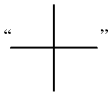

is a tert-butyl radical and, in numerical ranges, the upper and lower values are included, unless specified otherwise.

EXAMPLES 1–3

A 3 l steel autoclave is evacuated for half an hour at 110° C. and then flushed with ethylene at the same temperature. The autoclave is cooled to 20° C. 5 ml of a solution of 10 mg of zirconocene dichloride in 100 ml of toluene are mixed for 10 minutes with 2.5 ml of a 30% solution of methylaluminoxane in toluene and the mixture, diluted in 1000 ml of heptane, is introduced into the autoclave. The autoclave is closed, and 100 ml of hydrogen and ethylene up to a total pressure of 10 bar are added. The temperature is raised to 60–65° C. After 30 minutes the supply of ethylene is interrupted, the autoclave is let down and flooded with argon, and 100 mg of P-1 (or A-10 or H-1) are added in solid form. The autoclave is closed, and 100 ml of hydrogen and ethylene up to a total pressure of 10 bar are added. After polymerization for 2 hours, the autoclave is let down and the catalyst is deactivated by adding 10 ml of isopropanol. The heptane is distilled off in vacuo on a rotary evaporator and the polymer is dried at 60° C. in vacuo overnight.

During the prepolymerization, 10% of the total conversion is achieved; no reduction in the conversion is caused by the addition of the additives. The polymers comprising the additives show good processing, long-term and light stability.

EXAMPLE 4

A 3 l steel autoclave is evacuated for half an hour at 110° C. and then flushed with ethylene at the same temperature. The autoclave is cooled to 20° C. 5 ml of a solution of 10 mg of zirconocene dichloride in 100 ml of toluene are mixed for 10 minutes with 2.5 ml of a 30% solution of methylaluminoxane in toluene and the mixture, diluted in 1000 ml of heptane, is introduced into the autoclave together with 100 mg of AO-1. The autoclave is closed, and 100 ml of hydrogen and ethylene up to a total pressure of 10 bar are added. The temperature is raised to 60–65° C. After polymerization for 2 hours, the autoclave is let down and the catalyst is deactivated by adding 10 ml of isopropanol. The heptane is distilled off in vacuo on a rotary evaporator and the polymer is dried at 60° C. in vacuo overnight.

No reduction in the conversion is caused by the addition of the additive, in comparison with a polymerization without additive.

EXAMPLES 5–7

Preparation of the catalyst: 100 g Aerosil® 812 (Degussa; DE) are dried under argon at 800° C. 10 g thereof are suspended in 200 ml of toluene containing 100 mg of water. After stirring for 10 minutes, 3 ml of trimethylaluminium are added and the mixture is stirred for one hour. The solvent is removed by filtration and the residue is washed three times with 50 ml of heptane. The residue is suspended in 100 ml of heptane. A solution of 10 mg of zirconocene dichloride in 100 ml of toluene is added to the suspension, the mixture is stirred for one hour and then filtered, and the solid product is washed three times with 50 ml of heptane.

Polymerization: a 3 l steel autoclave is evacuated for half an hour at 110° C. and then flushed with ethylene at the same temperature. The autoclave is cooled to 20° C. 21 mg of the catalyst prepared by the above process, diluted in 1500 l of heptane, are introduced into the autoclave. The autoclave is closed, and 100 ml of hydrogen and ethylene up to a total pressure of 10 bar are added. The temperature is raised to 60–65° C. After 30 minutes the supply of ethylene is interrupted, the autoclave is let down and flooded with argon, and 100 mg of P-1 (or AO-1 or H-1) are added in solid form. The autoclave is closed, and 100 ml of hydrogen and ethylene up to a total pressure of 10 bar are added. After polymerization for 2 hours, the autoclave is let down and the catalyst is deactivated by adding 10 ml of isopropanol. The heptane is distilled off in vacuo on a rotary evaporator and the polymer is dried at 60° C. in vacuo overnight.

During the prepolymerization, 30% of the total conversion is achieved; no reduction in the conversion is caused by the addition of the additives. The polymers comprising the additives show good processing, long-term and light stability.

EXAMPLES 8–9

Preparation of the catalyst: 18.5 ml of a 30% solution of methylaluminoxane in toluene are charged in the absence of air (in a dry box under argon) to a 250 ml round-bottomed flask fitted with stopcock. 14 ml of toluene and 100 mg of racemic dimethylsilanediylbis(2-methyl-4,5-benzoindenyl) zirconium dichloride are then added. On the addition of the zirconocene complex, an orange solution is formed. After stirring at room temperature for 20 minutes, 4 g of SiO$_2$ (Grace 951, dried at 900° C.) are added in portions. After a further 30 minutes the solvent is stripped off in vacuo while the flask is heated to 70° C. and a gentle stream of argon is passed through it. The catalyst is then dried at 70° C. under a vacuum of 0.1 mbar for about 12 hours (removal of the toluene from the pores). Then the catalyst is suspended in 100 ml of hexane, the suspension is cooled to 0° C. outside the drybox, and a weak stream of ethylene, of about 20 ml/min, is passed through it with stirring. After 30 minutes the flask is transferred to the drybox, the solvent is removed by filtration, and the catalyst is briefly washed with hexane and dried in vacuo. 16 g of catalyst are obtained.

Polymerization: the stabilizers to be tested, 9 ml of 10% triethylaluminium solution (in hexane) and 200 mg of catalyst are charged under argon at 20° C. to a thoroughly dried 3 l steel autoclave (cf. Examples 1–7) and the autoclave is closed. 650 g of propylene are added in liquid form, the mixture is stirred and the temperature is raised to 65° C. over the course of 3 minutes. After 2 hours the autoclave is let down, 20 ml of isopropanol are added and the mixture is stirred at 700 for 15 minutes. The autoclave is then discharged and the polymer is dried at 70° C. for about 12 hours. Determined are the Yelloness Index (YI) according to ASTM D 1925, the Melt Flow value (MF) (PP: 2.16 kg230° C.) according to ISO 1133-1981, the melting point (m.p.) by means of "Differential Scanning Calorimetry" (DSC) and the "Oxygen Induction Time" value (OIT). The OIT-test is carried out as follows: a dice of 5 mm diameter is cut from a 0.5 mm thick compression moulded sheet of the polyolefin to be tested. The dice is put in an open DSC pan in the DSC cell. The cell is purged (50 ml/min) with nitrogen and heated to 200° C. When equilibrated, the gas is switched to oxygen (t=0). The time to the onset of the exotherm is determined. The higher the value, the better is the stabilization of the of the tested material.

The tested stablizer mixtures, as well as the test results are listed in the following table 1.

TABLE 1

| ex. | additive | amount [mg] | yield PP [g] | YI | OIT/200° C. [min] | MF [g/10 min] | m.p. [° C.] |
|---|---|---|---|---|---|---|---|
|  | — | — | 130 | 1.8 | 0.17 | 66.6 | 150 |
| 8 | AO-1 | 100 | 111 | 2.4 | 2.48 | 62.1 | 149 |
|  | P-1 | 200 |  |  |  |  |  |
| 9 | AO-1 | 100 | 104 | 2.6 | 2.62 | 47.5 | 149 |
|  | P-1 | 200 |  |  |  |  |  |
|  | HT-1 | 100 |  |  |  |  |  |

Additives used in the examples:

P-1: Tris-(2,4-di-tert.butylphenyl)-phosphite (Irgafos® 168)

P-2:

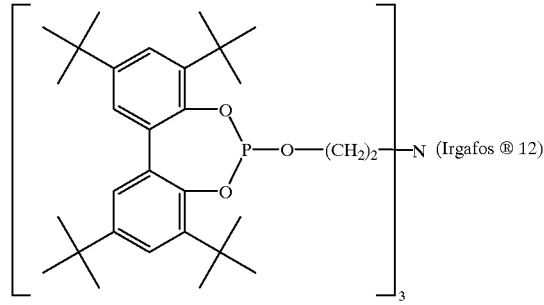

(Irgafos ® 12)

AO-1: Tris-1,3,5-(3,5-di-tert.butyl-4-hydroxybenzyl)-tri-2,4,6-methylbenzene (Irganox® 1330)

H-1:

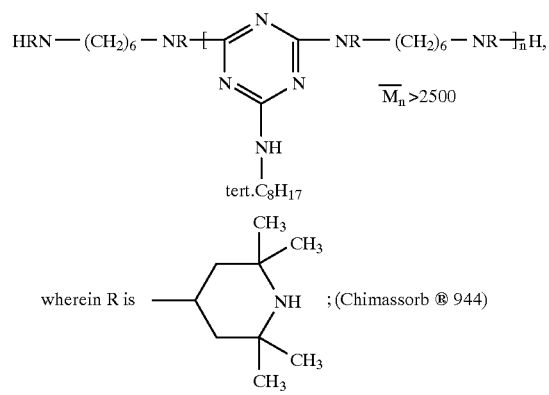

HT-1: DHT-4A; hydrotalcite from Kyowa, Japan

What is claimed is:

1. A process for the preparation of olefin polymers by polymerization over a transition metallocene catalyst, which comprises carrying out the polymerization with the addition of
   a) at least one phosphorous (III) compound which is tris(2,4-di-tert.-butylphenyl) phosphite or
   b) at least one phosphorous (III) compound which is tris(2,4-di-tert.-butylphenyl) phosphite and a sterically hindered phenol which is 1,3,5-tris(3,5-di-tert.-butyl-4-hydroxybenzyl)-2,4,6-trimethylbenzene or
   c) at least one phosphorous (III) compound which is tris(2,4-di-tert.-butylphenyl) phosphite and a sterically hindered phenol which is 1,3,5-tris(3,5-di-tert.-butyl-4-hydroxybenzyl)-2,4,6-trimethylbenzene and an acid scavenger which is a hydrotalcite DHT-4A, with the addition, where used, of a phosphorus(III) compound and/or sterically hindered amine, takes place only after polymerization has started and only after the total polymerization conversion is at least 0.1%.

2. A process according to claim 1, wherein the addition of the phosphorus(III) compound, sterically hindered amine, sterically hindered phenol or acid scavenger, alone or in combination with one another, takes place only when at least 1% of the total conversion has already taken place.

3. A process according to claim 1, wherein from 0.005 to 1% by weight, based on the polymer, of the phosphorus(III) compound, the sterically hindered amine, the sterically hindered phenol or the acid scavenger, alone or in combination with one another, is used.

4. A stabilized polyolefin obtainable by the process of claim 1.

5. Stabilized polyethylene or polypropylene according to claim 4 of high molecular weight.

6. A process according to claim 1 wherein the transition metallocene catalyst is a zirconium transition metallocene catalyst.

7. A stabilized polyolefin obtainable by the process of claim 6.

8. A stabilized polyethylene or polypropylene according to claim 7 of high molecular weight.

* * * * *